United States Patent
Mohri

(10) Patent No.: US 11,870,111 B2
(45) Date of Patent: Jan. 9, 2024

(54) WATER ELECTROLYSIS AND ELECTRICITY GENERATING SYSTEM

(71) Applicant: HONDA MOTOR CO., LTD., Tokyo (JP)

(72) Inventor: Masahiro Mohri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 17/679,025

(22) Filed: Feb. 23, 2022

(65) Prior Publication Data

US 2022/0311024 A1    Sep. 29, 2022

(30) Foreign Application Priority Data

Mar. 29, 2021    (JP) ................................ 2021-056054

(51) Int. Cl.
*H01M 8/043*    (2016.01)
*H01M 8/1004*    (2016.01)
(Continued)

(52) U.S. Cl.
CPC ............... *H01M 8/043* (2016.02); *C25B 1/04* (2013.01); *C25B 9/19* (2021.01); *C25B 15/02* (2013.01); *C25B 15/083* (2021.01); *H01M 8/04097* (2013.01); *H01M 8/04171* (2013.01); *H01M 8/04201* (2013.01); *H01M 8/04388* (2013.01); *H01M 8/04761* (2013.01); *H01M 8/1004* (2013.01); *H01M 16/003* (2013.01)

(58) Field of Classification Search
CPC .... H01M 8/04; H01M 8/043; H01M 8/04097; H01M 8/04171; H01M 8/04201; H01M 8/04388; H01M 8/04761; H01M 8/1004; H01M 8/0656; H01M 8/04089; H01M 16/003; C25B 1/04; C25B 15/02; C25B 15/083; C25B 9/23; C25B 9/60
See application file for complete search history.

(56) References Cited

U.S. PATENT DOCUMENTS

2014/0093795 A1* 4/2014 Sone ..................... H01M 8/186
429/418

FOREIGN PATENT DOCUMENTS

JP    2013-197079 A    9/2013
JP    2014-072119 A    4/2014
(Continued)

OTHER PUBLICATIONS

Office Action dated Nov. 1, 2022 issued over the corresponding Japanese Patent Application No. 2021-056054 with the English translation thereof.

*Primary Examiner* — Matthew W Van Oudenaren
(74) *Attorney, Agent, or Firm* — Carrier, Shende & Associates P.C.; Joseph P. Carrier; Jeffrey T. Gedeon

(57) ABSTRACT

A water electrolysis and electricity generating system is equipped with a second supply flow path, a second lead-out flow path, a second gas-liquid separator, a hydrogen exhaust gas circulation flow path, and a storage flow path. In the second lead-out flow path, product hydrogen gas and hydrogen exhaust gas are led out from a cell member. The second gas-liquid separator separates into a gas and a liquid the product hydrogen gas and the hydrogen exhaust gas which have been led out from the second lead-out flow path. The second lead-out flow path and the second gas-liquid separator are shared in common by a water electrolysis mode and an electricity generating mode.

3 Claims, 15 Drawing Sheets

(51) Int. Cl.
*H01M 8/0438* (2016.01)
*H01M 8/04082* (2016.01)
*H01M 8/04089* (2016.01)
*C25B 15/08* (2006.01)
*H01M 8/04746* (2016.01)
*C25B 9/19* (2021.01)
*C25B 1/04* (2021.01)
*C25B 15/02* (2021.01)
*H01M 8/04119* (2016.01)
*H01M 16/00* (2006.01)

(56) References Cited

FOREIGN PATENT DOCUMENTS

| | | |
|---|---|---|
| JP | 2014-072150 A | 4/2014 |
| JP | 2015-191846 A | 11/2015 |

* cited by examiner

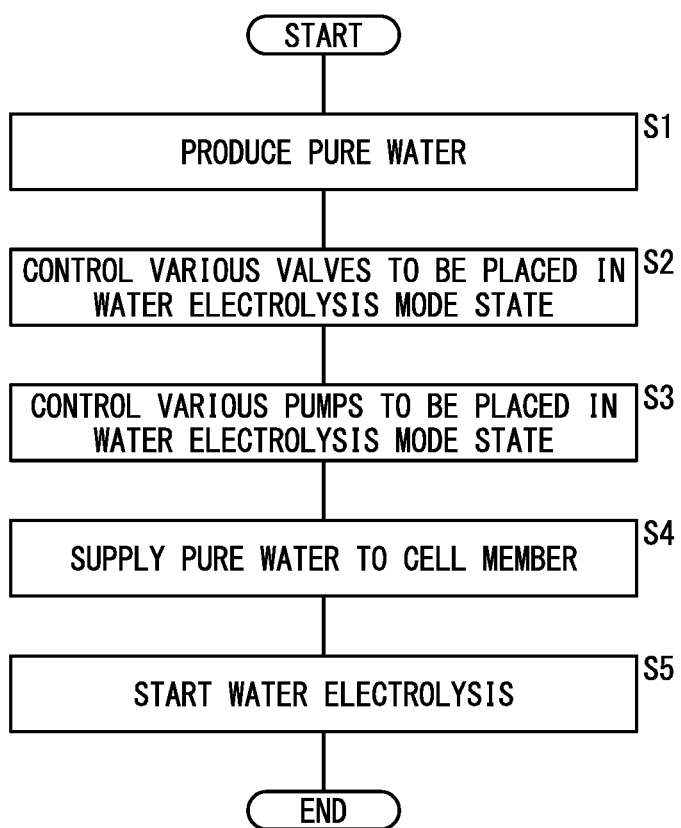

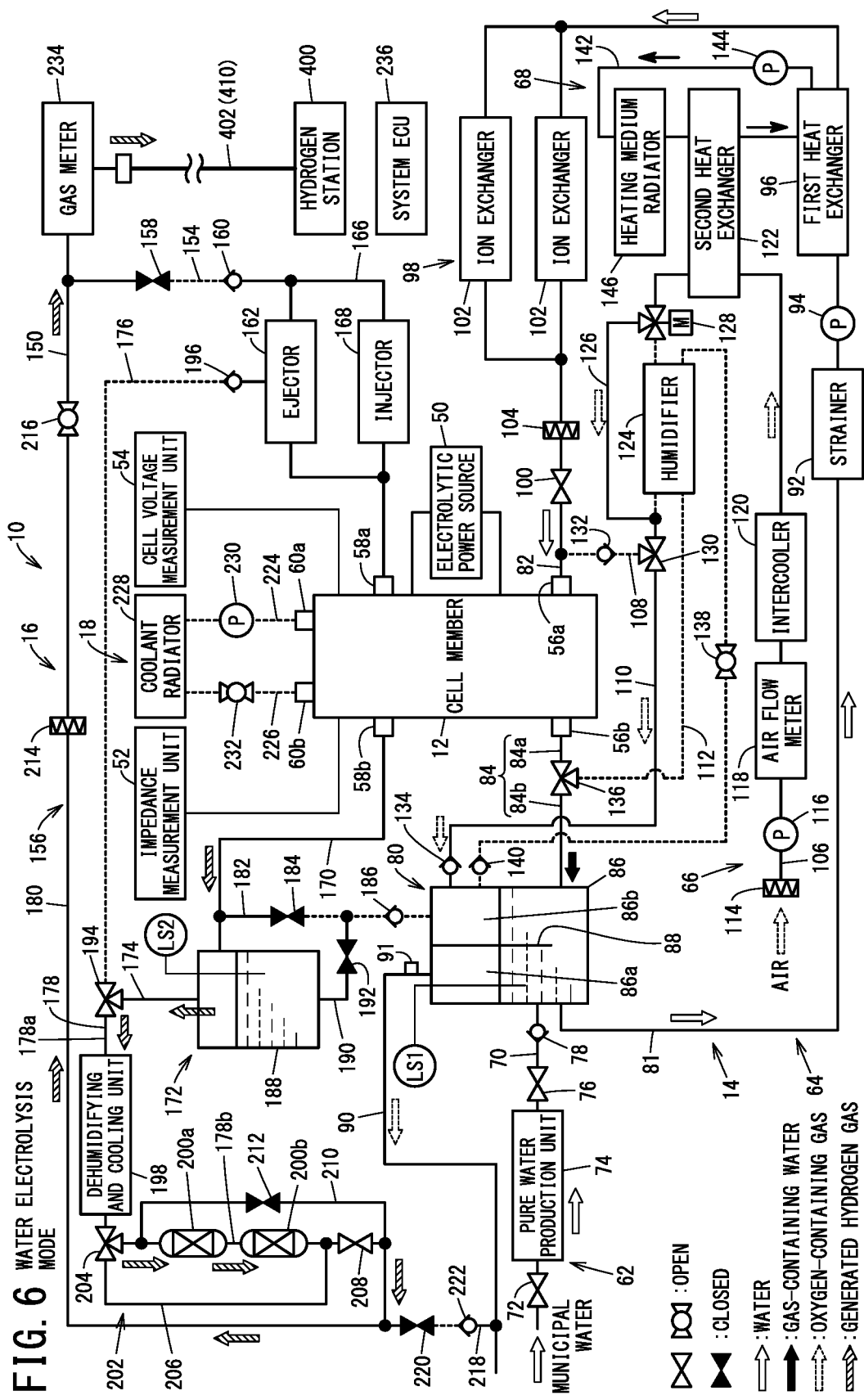

FIG. 7 WATER ELECTROLYSIS MODE

WATER ELECTROLYSIS AND ELECTRICITY GENERATING SYSTEM

CROSS-REFERENCE TO RELATED APPLICATIONS

This application is based upon and claims the benefit of priority from Japanese Patent Application No. 2021-056054 filed on Mar. 29, 2021, the contents of which are incorporated herein by reference.

BACKGROUND OF THE INVENTION

Field of the Invention

The present invention relates to a water electrolysis and electricity generating system.

Description of the Related Art

For example, in JP 2015-191846 A, a water electrolysis and electricity generating system equipped with a cell member is disclosed. The cell member includes an MEA (membrane electrode assembly), a first fluid flow path, and a second fluid flow path. The MEA includes an electrolyte membrane, and a first electrode and a second electrode that sandwich the electrolyte membrane therebetween. The first fluid flow path is a flow path through which water and an oxygen-containing gas are supplied to the first electrode. The second fluid flow path is a flow path through which hydrogen gas is supplied to the second electrode. Such a water electrolysis and electricity generating system is capable of switching between a water electrolysis mode and an electricity generating mode. In the water electrolysis mode, the water electrolysis and electricity generating system electrolyzes the water supplied to the first electrode, and thereby causes a product hydrogen gas to be generated at the second electrode. In the electricity generating mode, electricity is generated by an electrochemical reaction that takes place between the oxygen-containing gas supplied to the first electrode and the hydrogen gas supplied to the second electrode.

SUMMARY OF THE INVENTION

In the aforementioned water electrolysis and electricity generating system, it is desirable that the system can be made smaller in scale by a simple configuration, together with reducing the manufacturing cost of the system.

The present invention has the object of solving the aforementioned problems.

One aspect of the present invention is characterized by a water electrolysis and electricity generating system comprising a cell member having an MEA in which an electrolyte membrane is sandwiched between a first electrode and a second electrode, a first fluid flow path configured to supply water and an oxygen-containing gas to the first electrode, and a second fluid flow path configured to supply hydrogen gas to the second electrode, wherein the water electrolysis and electricity generating system is capable of being switched between a water electrolysis mode, in which the water supplied to the first electrode is electrolyzed to thereby generate product hydrogen gas at the second electrode, and an electricity generating mode, in which electricity is generated by an electrochemical reaction that takes place between the oxygen-containing gas supplied to the first electrode and the hydrogen gas supplied to the second electrode, the water electrolysis and electricity generating system further comprising a supply flow path configured to supply the hydrogen gas to the second fluid flow path, a lead-out flow path through which the product hydrogen gas is led out from the second fluid flow path at a time of the water electrolysis mode, and through which a hydrogen exhaust gas is led out from the second fluid flow path at a time of the electricity generating mode, a gas-liquid separator configured to separate into a gas and a liquid the product hydrogen gas and the hydrogen exhaust gas that are led out from the lead-out flow path, a circulation flow path configured to guide the hydrogen exhaust gas, which has been separated into a gas and a liquid by the gas-liquid separator, to the supply flow path, and a storage flow path configured to guide the product hydrogen gas, which has been separated into a gas and a liquid by the gas-liquid separator, to a hydrogen storage unit, wherein the lead-out flow path and the gas-liquid separator are shared in common by the hydrogen electrolysis mode and the electricity generating mode.

According to the present invention, since the lead-out flow path and the gas-liquid separator are shared in common by the water electrolysis mode and the electricity generating mode, there is no need to separately provide a lead-out flow path and a gas-liquid separator for use by the water electrolysis mode, and a lead-out flow path and a gas-liquid separator for use by the electricity generating mode. Therefore, the water electrolysis and electricity generating system can be made smaller in scale, together with enabling a reduction in the manufacturing cost of the system by a simple configuration.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a flowchart illustrating a water electrolysis mode of the water electrolysis and electricity generating system;

FIG. 6 is an explanatory diagram of operations in the water electrolysis mode;

FIG. 7 is an explanatory diagram of switching between dehumidification performed by a first dehumidifying adsorption unit and a second dehumidifying adsorption unit;

DESCRIPTION OF THE INVENTION

Figure 1:
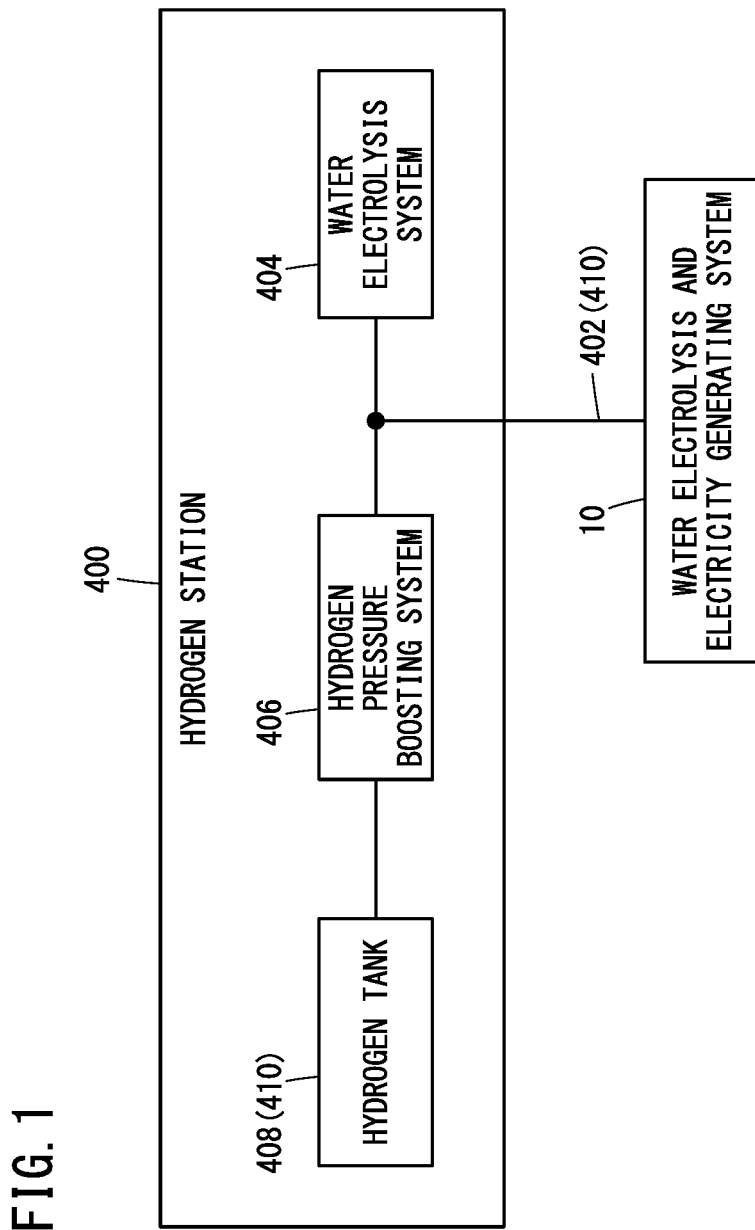
FIG. 1 is a schematic diagram showing a water electrolysis and electricity generating system and a hydrogen station according to an embodiment of the present invention.

A water electrolysis and electricity generating system 10 according to an embodiment of the present invention is a system that produces hydrogen gas using electrical power (surplus electrical power) such as renewable energy or the like, and generates electricity using the hydrogen gas in the case that electrical power is required. As shown in FIG. 1, the water electrolysis and electricity generating system 10 is connected, for example, to a hydrogen station 400 via a low pressure hydrogen pipeline 402.

The hydrogen station 400 comprises a water electrolysis system 404, a hydrogen pressure boosting system 406, and a hydrogen tank 408. The water electrolysis system 404 produces hydrogen gas by electrolyzing water using electrical power in the form of renewable energy or the like. The hydrogen pressure boosting system 406 raises the pressure of the hydrogen gas produced by the water electrolysis system 404, and stores the hydrogen in the hydrogen tank 408. Hydrogen gas (including byproduct hydrogen gas) manufactured and transported from another factory or the like may be stored in the hydrogen tank 408.

The low pressure hydrogen pipeline 402 supplies the hydrogen gas stored in the hydrogen tank 408 of the hydrogen station 400 or the hydrogen gas produced by the water electrolysis system 404 to the water electrolysis and electricity generating system 10. Further, the low pressure hydrogen pipeline 402 supplies the hydrogen gas (hydrogen gas that has not accumulated) produced by the water electrolysis and electricity generating system 10 to the hydrogen pressure boosting system 406 in order to be stored in the hydrogen tank 408. The low pressure hydrogen pipeline 402 also functions as a tank for storing the hydrogen gas. Stated otherwise, in the present embodiment, the hydrogen tank 408 and the low pressure hydrogen pipeline 402 function as a hydrogen storage unit 410.

Figure 2:
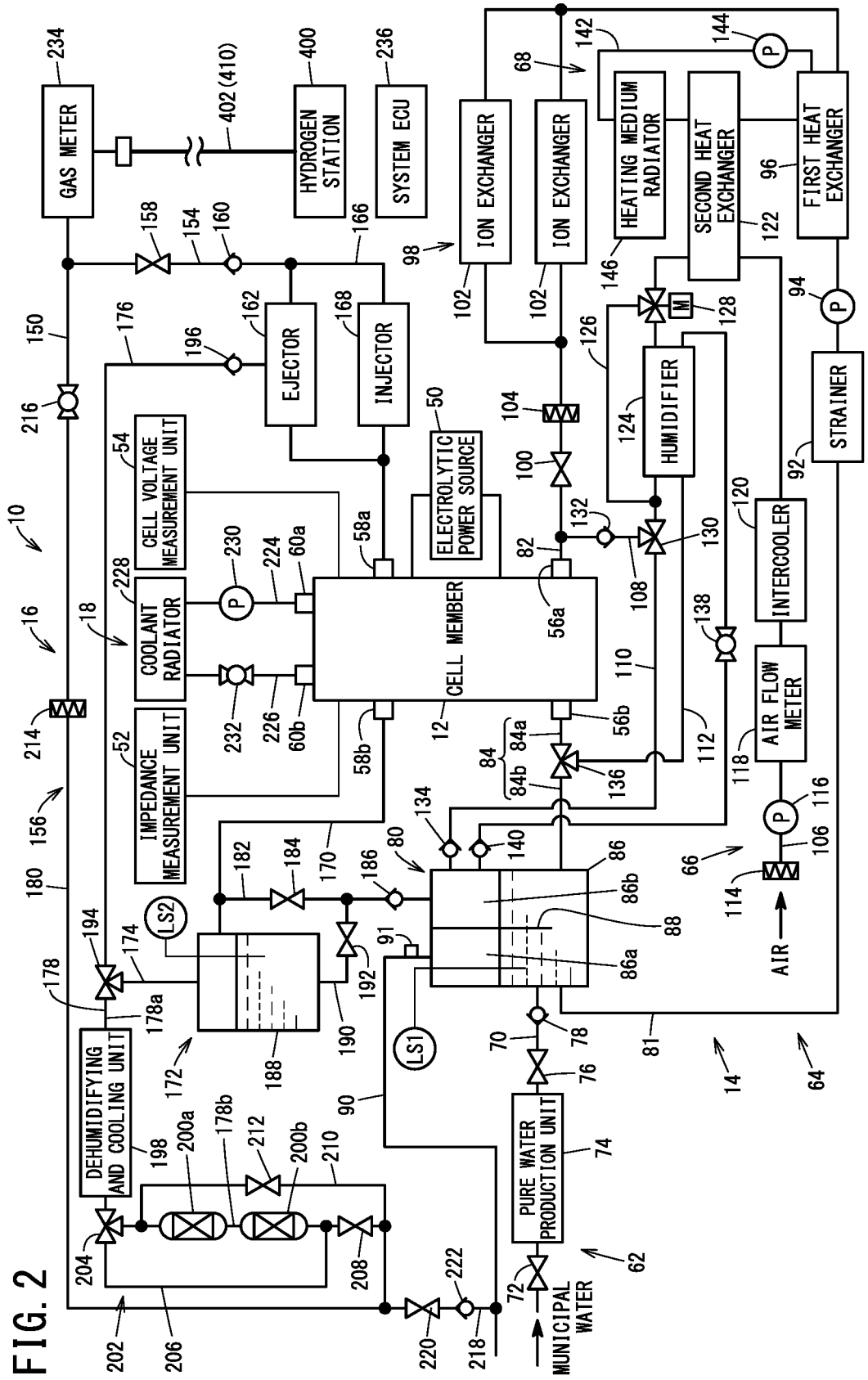
FIG. 2 is a schematic configuration explanatory diagram of the water electrolysis and electricity generating system shown in FIG. 1.

As shown in FIG. 2, the water electrolysis and electricity generating system 10 comprises a cell member 12, a first device 14, a second device 16, and a cooling device 18.

Figure 3:
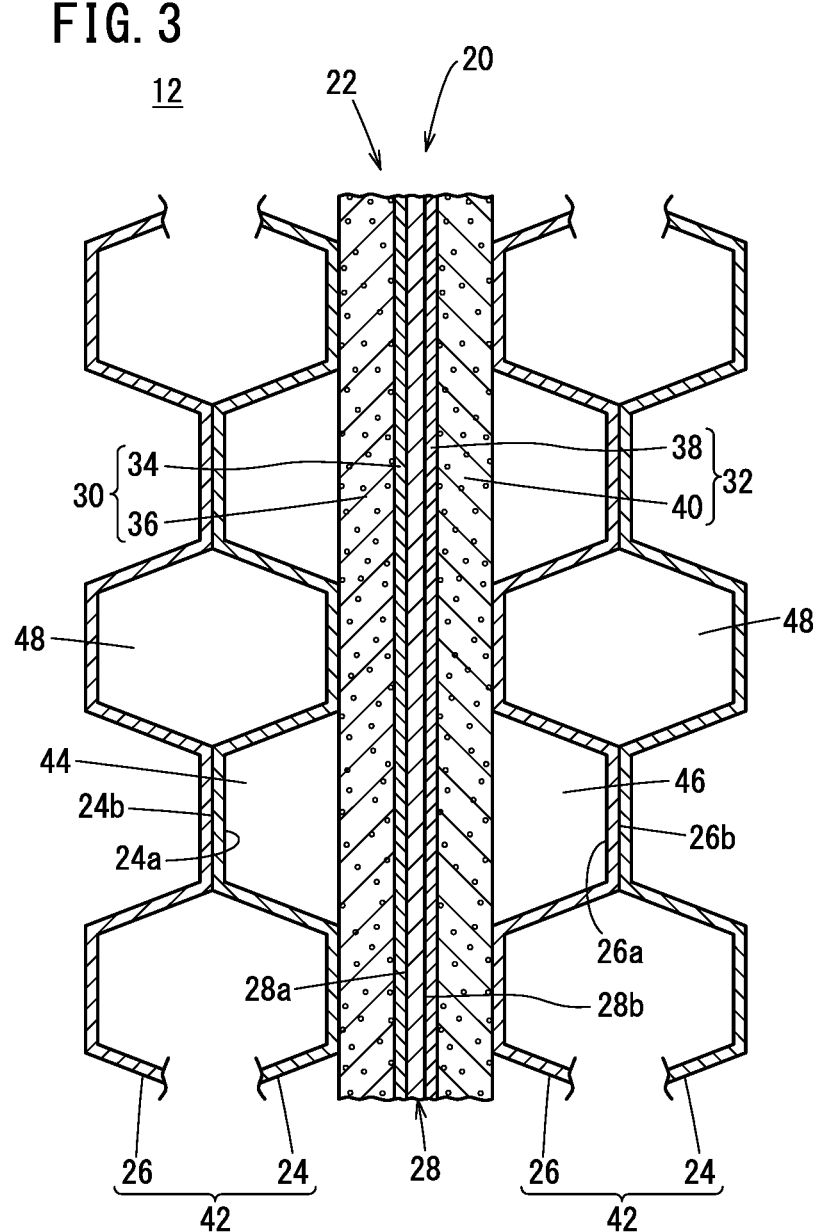
FIG. 3 is a cross-sectional explanatory view with partial omission of a cell member shown in FIG. 2.

As shown in FIG. 3, the cell member 12 includes a stack in which a plurality of cells 20 are stacked. Each of the cells 20 includes an MEA 22 (membrane electrode assembly), and a first separator 24 and a second separator 26 sandwiching the MEA 22 therebetween. The MEA 22 includes an electrolyte membrane 28, a first electrode 30, and a second electrode 32. The first electrode 30 is arranged on one surface 28a of the electrolyte membrane 28. The second electrode 32 is arranged on another surface 28b of the electrolyte membrane 28. The electrolyte membrane 28, for example, is a solid polymer electrolyte membrane (cation exchange membrane). Such a solid polymer electrolyte membrane, for example, is a thin membrane of perfluorosulfonic acid containing water.

The first electrode 30 includes a first electrode catalyst layer 34 and a first gas diffusion layer 36. The first electrode catalyst layer 34 is bonded to one surface 28a of the electrolyte membrane 28. The first gas diffusion layer 36 is laminated on the first electrode catalyst layer 34. The second electrode 32 includes a second electrode catalyst layer 38 and a second gas diffusion layer 40. The second electrode catalyst layer 38 is bonded to another surface 28b of the electrolyte membrane 28. The second gas diffusion layer 40 is laminated on the second electrode catalyst layer 38.

The first electrode catalyst layer 34 includes, for example, porous carbon particles on which a platinum alloy is supported on surfaces thereof. The porous carbon particles are uniformly coated together with the ion conductive polymer binder on the surface of the first gas diffusion layer 36. The second electrode catalyst layer 38 includes, for example, porous carbon particles on which a platinum alloy is supported on surfaces thereof. The porous carbon particles are uniformly coated together with the ion conductive polymer binder on the surface of the second gas diffusion layer 40. The first gas diffusion layer 36 and the second gas diffusion layer 40 include carbon paper or carbon cloth or the like.

The first separator 24 and the second separator 26 are formed by press-forming a thin metal plate to have a corrugated cross-sectional shape. The thin metal plate, for example, is a steel plate, a stainless steel plate, an aluminum plate, or a plated steel plate. The thin metal plate may be a stainless steel plate on which a surface treatment for protection against corrosion has been implemented, or an aluminum plate on which a surface treatment for protection against corrosion has been implemented. The first separator 24 and the second separator 26 are joined to each other by a plurality of non-illustrated bonding lines to thereby form a joint separator 42.

A surface 24a of the first separator 24 facing toward the MEA 22 includes a first fluid flow path 44. A surface 26a of the second separator 26 facing toward the MEA 22 includes a second fluid flow path 46. A coolant flow path 48 through which a coolant flows is located between the surface 24b of the first separator 24 and a surface 26b of the second separator 26 that are joined to each other. The coolant flow path 48 is formed by overlapping a rear surface shape of the first separator 24 in which the first fluid flow path 44 is formed and a rear surface shape of the second separator 26 in which the second fluid flow path 46 is formed.

As shown in FIG. 2, an electrolytic power source 50, which is a DC power source, is electrically connected to the cell member 12. The water electrolysis and electricity generating system 10, which is equipped with such a cell member 12, is capable of switching between a water electrolysis mode and an electricity generating mode (fuel cell mode). In the water electrolysis mode, the water electrolysis and electricity generating system 10 electrolyzes the water supplied to the first electrode 30, and thereby causes a product hydrogen gas to be generated at the second electrode 32. In the electricity generating mode, the water electrolysis and electricity generating system 10 generates electricity by an electrochemical reaction that takes place between the oxygen-containing gas supplied to the first electrode 30 and the hydrogen gas supplied to the second electrode 32. Although detailed illustration thereof is omitted, the electrical power generated by the cell member 12 is used, for example, for charging a non-illustrated battery or the like. Moreover, the electrical power generated by the cell member 12 may be converted into AC power and supplied to a system power supply network.

An impedance measurement unit 52 and a cell voltage measurement unit 54 are attached to the cell member 12. The impedance measurement unit 52 measures a DC resistance component of the cell member 12 from the cell voltage, by energizing the first electrode 30 and the second electrode 32 with a non-illustrated AC power source. The cell voltage measurement unit 54 measures the cell voltage of each of the cells 20 at the time that electricity is generated.

A first inlet port member 56*a*, a first outlet port member 56*b*, a second inlet port member 58*a*, a second outlet port member 58*b*, a coolant inlet port member 60*a*, and a coolant outlet port member 60*b* are installed in the cell member 12. The first inlet port member 56*a* and the first outlet port member 56*b* communicate with the first fluid flow path 44 of the cell member 12 (refer to FIG. 3). The first inlet port member 56*a* and the first outlet port member 56*b* are connected to the first device 14. At the time of the water electrolysis mode, water is supplied from the first device 14 to the first inlet port member 56*a*. At the time of the electricity generating mode, the oxygen-containing gas is supplied from the first device 14 to the first inlet port member 56*a*. At the time of the water electrolysis mode, a gas-containing water, in which there is contained the product hydrogen gas and byproduct oxygen, is led out from the first fluid flow path 44 into the first outlet port member 56*b*. At the time of the electricity generating mode, an oxygen containing exhaust gas in which generated water is contained is led out from the first fluid flow path 44 into the first outlet port member 56*b*.

The second inlet port member 58*a* and the second outlet port member 58*b* communicate with the second fluid flow path 46 of the cell member 12 (refer to FIG. 3). The second inlet port member 58*a* and the second outlet port member 58*b* are connected to the second device 16. At the time of the water electrolysis mode, nothing is supplied from the second device 16 to the second inlet port member 58*a*. At the time of the electricity generating mode, the hydrogen gas is supplied from the second device 16 to the second inlet port member 58*a*. At the time of the water electrolysis mode, a product hydrogen gas in which water is contained is led out from the second fluid flow path 46 into the second outlet port member 58*b*. At the time of the electricity generating mode, a hydrogen exhaust gas in which water is contained is led out from the second fluid flow path 46 into the second outlet port member 58*b*.

The coolant inlet port member 60*a* and the coolant outlet port member 60*b* communicate with the coolant flow path 48 of the cell member 12 (refer to FIG. 3). The coolant inlet port member 60*a* and the coolant outlet port member 60*b* are connected to the cooling device 18.

The first device 14 comprises a pure water supply unit 62, a water circulation unit 64, an oxygen-containing gas device 66, and a heat exchange device 68. The pure water supply unit 62 includes a water supply flow path 70 in order to supply water (pure water) to the water circulation unit 64. A municipal water supply valve 72, a pure water production unit 74, a pure water regulating valve 76, and a check valve 78 are installed in the water supply flow path 70 sequentially in this order from an upstream side toward the water circulation unit 64.

The municipal water supply valve 72 is an opening/closing valve that opens and closes the water supply flow path 70. The municipal water supply valve 72 adjusts the amount of municipal water supplied to the pure water production unit 74. Although not shown in the drawings, the pure water production unit 74 produces pure water, for example, by circulating the municipal water through an activated carbon filter, an ion exchange resin (ion exchange resin column), and a hollow fiber filter. The pure water regulating valve 76 is an opening/closing valve that opens and closes the water supply flow path 70. The pure water regulating valve 76 adjusts the amount of the pure water produced by the pure water production unit 74 that is supplied to the water circulation unit 64. The check valve 78 permits the flow of the pure water from the pure water production unit 74 to the water circulation unit 64, and blocks the flow of the fluid from the water circulation unit 64 to the pure water production unit 74.

The water circulation unit 64 comprises a first gas-liquid separator 80, a water introduction flow path 81, a first supply flow path 82, and a first lead-out flow path 84. The water introduction flow path 81 is connected to the first gas-liquid separator 80. The first supply flow path 82 connects the water introduction flow path 81 and the first inlet port member 56*a* to each other. The first lead-out flow path 84 connects the first outlet port member 56*b* and the first gas-liquid separator 80 to each other.

The first gas-liquid separator 80 separates into a gas and a liquid the fluid that is led out from the cell member 12. More specifically, at the time of the water electrolysis mode, the first gas-liquid separator 80 separates into a gas and a liquid the gas-containing water that is led out from the first outlet port member 56*b* of the cell member 12. Further, at the time of the electricity generating mode, the first gas-liquid separator 80 separates into a gas and a liquid the oxygen containing exhaust gas that is led out from the first outlet port member 56*b* of the cell member 12. Furthermore, at the time of the electricity generating mode, the first gas-liquid separator 80 separates into a gas and a liquid the hydrogen exhaust gas that is guided from the second outlet port member 58*b* via the second device 16.

The first gas-liquid separator 80 includes a first storage unit 86 that is capable of storing water. Pure water is supplied to the first storage unit 86 from the pure water supply unit 62. Further, the water, which has been separated from the fluid that is led out from the cell member 12, is stored in the first storage unit 86. Therefore, mixed water, in which there are mixed the pure water that is guided from the pure water supply unit 62 and the water that has been separated from the fluid that is led out from the cell member 12, is stored in the first storage unit 86.

The first storage unit 86 includes a partition wall 88 that partitions a more upper side than the water surface inside the first storage unit 86 into a first chamber 86*a* and a second chamber 86*b*. The partition wall 88 is separated from a bottom surface of the first storage unit 86. A portion of the partition wall 88 is immersed in the water inside the first storage unit 86. Water is introduced from the water supply flow path 70 into the first chamber 86*a* of the first storage unit 86. The fluid that is led out from the cell member 12 is introduced into the second chamber 86*b* of the first storage unit 86.

In the first gas-liquid separator 80, a gas component of the fluid that is guided to the second chamber 86*b* is guided within the water (between the partition wall 88 and the bottom surface of the first storage unit 86) into the first chamber 86*a*. The gas component that is guided to the first chamber 86*a* is discharged to the exterior through an exhaust gas flow path 90 connected to an upper part of the first chamber 86*a* in the first storage unit 86. A hydrogen sensor 91 in order to detect a concentration of the hydrogen gas within the gas component is installed in the exhaust gas flow path 90. The exhaust gas flow path 90 includes a non-illustrated diffusion pipe in order to diffuse a gas component (the hydrogen gas) at a position of greater than or equal to 5 m from the ground.

The amount of water in the first storage unit 86 is controlled in a manner so that a portion of the partition wall 88 is always immersed in the water. Therefore, the first storage unit 86 also functions as a water sealing device for preventing back firing. More specifically, the first storage unit 86 prevents propagation of flames from the exhaust gas flow path 90 into the second chamber 86b, for example, in the case that the exhaust gas flow path 90 is struck by lightning. Further, the first storage unit 86 prevents propagation of flames from the first outlet port member 56b into the exhaust gas flow path 90, for example, in the case that the first outlet port member 56b of the cell member 12 is ignited or set on fire.

The partition wall 88 also functions as a wave dissipating plate that suppresses waves on the water surface of the second chamber 86b from being transmitted to the water surface of the first chamber 86a at the time of gas-liquid separation. Consequently, the water level in the first chamber 86a can be stabilized. A first water level sensor LS1 (first water level acquisition unit) for acquiring the amount of water in the first storage unit 86 is installed in the first chamber 86a of the first storage unit 86.

One end of the water introduction flow path 81 is connected to the first storage unit 86. A strainer 92, a water pump 94, a first heat exchanger 96, a water purification treatment unit 98, and a pure water supply valve 100 are installed in the water introduction flow path 81 sequentially in this order from the first gas-liquid separator 80 toward the first supply flow path 82.

The strainer 92 removes foreign matter (particulate suspended matter) from the water that is guided from the first storage unit 86. The water pump 94 is an electric water pump for use in performing water electrolysis. The water pump 94 causes the water inside the first storage unit 86 to flow through the water introduction flow path 81, the first supply flow path 82, the cell member 12 (the first fluid flow path 44), and the first lead-out flow path 84, and be returned to the first storage unit 86. The first heat exchanger 96 adjusts to a desired temperature the water that is transferred thereto from the water pump 94. The first heat exchanger 96, for example, is a water-cooled intercooler.

The water purification treatment unit 98 performs a water purifying treatment on the water that is guided from the first heat exchanger 96. Consequently, the water, which has been separated by the first gas-liquid separator 80 from the fluid that is led out from the cell member 12, can be reused. Therefore, the amount of municipal water used per unit amount of the hydrogen gas produced at the time of the water electrolysis mode can be reduced. Further, a replacement cycle of component parts (the activated carbon filter, the ion exchange resin, the hollow fiber filter, and the like) of the pure water production unit 74 in order to convert the municipal water into pure water can be lengthened. Thus, it is possible to reduce the operating cost and the maintenance cost of the water electrolysis and electricity generating system 10. Furthermore, the water supplied to the cell member 12 can always be pure water. Therefore, it is possible to reliably manage a liquid junction resistance and a ground fault resistance that are required for water electrolysis.

The water purification treatment unit 98 includes, for example, a plurality of ion exchangers 102 and a mesh filter 104. The plurality of ion exchangers 102 are arranged in parallel with each other. Consequently, as compared to a case in which the plurality of ion exchangers 102 are arranged in series, it is possible to reduce a loss in pressure when the water flows through the ion exchangers 102. The ion exchangers 102 preferably include, for example, replaceable cartridges. The mesh filter 104 removes foreign matter from the water that flows through the ion exchangers 102. The pure water supply valve 100 is an opening/closing valve that opens and closes the first fluid flow path 44.

The first supply flow path 82 introduces the water (pure water) that is guided from the water introduction flow path 81 into the first inlet port member 56a. The first lead-out flow path 84 is connected to a wall of the second chamber 86b of the first storage unit 86.

The oxygen-containing gas device 66 includes an oxygen-containing gas flow path 106, an oxygen-containing gas introduction flow path 108, a dilution flow path 110, and an oxygen-containing gas lead-out flow path 112. An air filter 114, an air pump 116, an air flow meter 118 (oxygen-containing gas flow rate acquisition unit), an intercooler 120, a second heat exchanger 122, and a humidifier 124 are installed in the oxygen-containing gas flow path 106 sequentially in this order from an upstream side toward a downstream side.

The air filter 114 removes foreign substances inside the air (the oxygen-containing gas). The air pump 116 supercharges (compresses) the purified oxygen-containing gas through the air filter 114. As the air pump 116, for example, a positive displacement electric motor turbo pump is used. Only one air pump 116 is installed in the oxygen-containing gas flow path 106.

The air flow meter 118 acquires the flow rate of the oxygen-containing gas that is guided thereto from the air pump 116. The intercooler 120 cools the oxygen-containing gas, which has been raised in temperature due to being supercharged by the air pump 116. The intercooler 120, for example, is an air-cooled intercooler. More specifically, the intercooler 120 adjusts the temperature of the oxygen-containing gas by controlling the rotational speed of a non-illustrated fan.

The second heat exchanger 122 adjusts to a desired temperature the oxygen-containing gas that is cooled by the intercooler 120. The second heat exchanger 122, for example, is a water-cooled intercooler. The humidifier 124 humidifies the oxygen-containing gas that is guided thereto from the second heat exchanger 122.

A first bypass flow path 126, which detours to avoid the humidifier 124, is installed in the oxygen-containing gas flow path 106. One end (an end on an upstream side) of the first bypass flow path 126 is connected via a flow rate control valve 128 between the humidifier 124 and the second heat exchanger 122 in the oxygen-containing gas flow path 106. Another end (an end on a downstream side) of the first bypass flow path 126 is connected more on a downstream side than the humidifier 124 in the oxygen-containing gas flow path 106.

The flow rate control valve 128 adjusts a ratio between the flow rate of the oxygen-containing gas that is guided to the humidifier 124 and the flow rate of the oxygen-containing gas that is guided to the first bypass flow path 126. An electric variable three-way valve, for example, is preferably used as the flow rate control valve 128.

The oxygen-containing gas introduction flow path 108 and the dilution flow path 110 are connected via a first flow path switching valve 130 to an end on the downstream side of the oxygen-containing gas flow path 106. The first flow path switching valve 130 is capable of switching between a flow through state of the oxygen-containing gas introduction flow path 108 and a flow through state of the dilution flow path 110.

In the flow through state of the oxygen-containing gas introduction flow path 108, the first flow path switching valve 130 permits the flow of the oxygen-containing gas from the oxygen-containing gas flow path 106 to the oxygen-containing gas introduction flow path 108, together with blocking the flow of the oxygen-containing gas from the oxygen-containing gas flow path 106 to the dilution flow path 110. In the flow through state of the dilution flow path 110, the first flow path switching valve 130 permits the flow of the oxygen-containing gas from the oxygen-containing gas flow path 106 to the dilution flow path 110, together with blocking the flow of the oxygen-containing gas from the oxygen-containing gas flow path 106 to the oxygen-containing gas introduction flow path 108. A three-way valve, for example, is preferably used as the first flow path switching valve 130.

The oxygen-containing gas introduction flow path 108 guides the oxygen-containing gas that flows through the oxygen-containing gas flow path 106 to the first supply flow path 82. The first supply flow path 82 introduces the oxygen-containing gas that is guided from the oxygen-containing gas introduction flow path 108 into the first inlet port member 56a. Stated otherwise, at the time of the water electrolysis mode, the first supply flow path 82 introduces the water that is guided from the water introduction flow path 81 into the first inlet port member 56a. Further, at the time of the electricity generating mode, the first supply flow path 82 introduces the oxygen-containing gas that is guided from the oxygen-containing gas introduction flow path 108 into the first inlet port member 56a. In other words, in the water electrolysis and electricity generating system 10, the first supply flow path 82 is shared in common by the water electrolysis mode and the electricity generating mode.

A check valve 132 is installed in the oxygen-containing gas introduction flow path 108. The check valve 132 permits the flow of the oxygen-containing gas from the first flow path switching valve 130 to the first supply flow path 82, and blocks the flow of the fluid from the first supply flow path 82 to the first flow path switching valve 130.

The dilution flow path 110 guides the oxygen-containing gas (a diluting gas) that flows through the oxygen-containing gas flow path 106 to the second chamber 86b of the first storage unit 86. The check valve 134 is installed in the dilution flow path 110. The check valve 134 permits the flow of the oxygen-containing gas from the first flow path switching valve 130 to the first storage unit 86, and blocks the flow of the fluid from the first storage unit 86 to the first flow path switching valve 130.

At the time of the electricity generating mode, the oxygen-containing gas lead-out flow path 112 guides the oxygen containing exhaust gas, which is led out to the first lead-out flow path 84 from the first outlet port member 56b of the cell member 12, to the second chamber 86b of the first storage unit 86.

The oxygen-containing gas lead-out flow path 112 is connected, via a second flow path switching valve 136, to the first lead-out flow path 84. Stated otherwise, the first lead-out flow path 84 includes an upstream side lead-out flow path 84a on an upstream side of the second flow path switching valve 136, and a downstream side lead-out flow path 84b on a downstream side of the second flow path switching valve 136. The second flow path switching valve 136 is capable of switching between a flow through state of the oxygen-containing gas lead-out flow path 112 and a flow through state of the downstream side lead-out flow path 84b.

In the flow through state of the oxygen-containing gas lead-out flow path 112, the second flow path switching valve 136 permits the flow of the oxygen-containing gas (the oxygen containing exhaust gas) from the upstream side lead-out flow path 84a to the oxygen-containing gas lead-out flow path 112, together with blocking the flow of the fluid (the oxygen containing exhaust gas) from the upstream side lead-out flow path 84a to the downstream side lead-out flow path 84b. In the flow through state of the downstream side lead-out flow path 84b, the second flow path switching valve 136 permits the flow of the fluid (the gas-containing water) from the upstream side lead-out flow path 84a to the downstream side lead-out flow path 84b, together with blocking the flow of the fluid (the gas-containing water) from the upstream side lead-out flow path 84a to the oxygen-containing gas lead-out flow path 112. A three-way valve, for example, is preferably used as the second flow path switching valve 136.

The humidifier 124, a first back pressure valve 138, and a check valve 140 are installed sequentially in this order in the oxygen-containing gas lead-out flow path 112 from the first lead-out flow path 84 toward the first storage unit 86. In particular, the humidifier 124 is installed so as to straddle over the oxygen-containing gas introduction flow path 108 and the oxygen-containing gas lead-out flow path 112. The humidifier 124 humidifies the oxygen-containing gas that flows through the oxygen-containing gas flow path 106 by the oxygen containing exhaust gas (including the generated water) that flows through the oxygen-containing gas lead-out flow path 112. The first back pressure valve 138 regulates the flow rate of the oxygen containing exhaust gas that flows through the oxygen-containing gas lead-out flow path 112. A diaphragm valve, for example, is preferably used as the first back pressure valve 138. The check valve 140 permits the flow of the oxygen containing exhaust gas from the first back pressure valve 138 to the first storage unit 86, and blocks the flow of the fluid from the first storage unit 86 to the first back pressure valve 138.

The heat exchange device 68 includes a heating medium circulation flow path 142 through which the heating medium flows. In the heat exchange device 68, an antifreeze solution is preferably used as the heating medium. A diluted liquid (a coolant) containing 50% ethylene glycol, for example, is preferably used as the antifreeze solution, taking into consideration specific heat and viscosity. However, any appropriate fluid may be used as the heating medium.

A heating medium pump 144, a heating medium radiator 146, the first heat exchanger 96, and the second heat exchanger 122 are installed in the heating medium circulation flow path 142. The heating medium pump 144 causes the heating medium to be circulated through the heating medium circulation flow path 142. The heating medium radiator 146 is positioned on a downstream side of the heating medium pump 144 in the heating medium circulation flow path 142. The heating medium radiator 146 carries out heat exchange between the heating medium and the atmosphere. The heating medium radiator 146 adjusts the temperature of the heating medium by adjusting the rotational speed of a non-illustrated fan.

The first heat exchanger 96 is positioned on a more downstream side than the heating medium radiator 146 in the heating medium circulation flow path 142. The first heat exchanger 96 carries out heat exchange between the water that flows through the water introduction flow path 81 and the heating medium. The second heat exchanger 122 is positioned between the heating medium radiator 146 and the first heat exchanger 96 in the heating medium circulation flow path 142. In particular, the second heat exchanger 122 is positioned on a more upstream side than the first heat exchanger 96 in the heating medium circulation flow path 142. The second heat exchanger 122 carries out heat exchange between the oxygen-containing gas that flows through the oxygen-containing gas flow path 106 and the heating medium.

Although illustration thereof is omitted, the heat exchange device 68 further includes a heating medium tank, a pressure regulating valve, and the like for adjusting the flow rate of the heating medium inside the heating medium circulation flow path 142.

The second device 16 comprises a supply and discharge flow path 150, a second supply flow path 154, and a hydrogen lead-out unit 156. The supply and discharge flow path 150 communicates with the low pressure hydrogen pipeline 402. The second supply flow path 154 guides the hydrogen gas, which is guided to the supply and discharge flow path 150 from the low pressure hydrogen pipeline 402, to the second inlet port member 58a of the cell member 12.

A hydrogen gas supply valve 158, a check valve 160, and an ejector 162 are installed in the second supply flow path 154 sequentially in this order from the supply and discharge flow path 150 toward the second inlet port member 58a. The hydrogen gas supply valve 158 is a shutoff valve that opens and closes the second supply flow path 154. The check valve 160 permits the flow of the hydrogen gas from the supply and discharge flow path 150 to the second inlet port member 58a, and blocks the flow of the fluid from the second inlet port member 58a to the supply and discharge flow path 150. A hydrogen exhaust gas circulation flow path 176 is connected to the ejector 162. At the time of the electricity generating mode, the hydrogen exhaust gas circulation flow path 176 returns the hydrogen exhaust gas that is led out from the second outlet port member 58b of the cell member 12 to the second supply flow path 154. Due to the hydrogen gas that is guided from the supply and discharge flow path 150, the ejector 162 draws in the hydrogen exhaust gas from the hydrogen exhaust gas circulation flow path 176, mixes the hydrogen exhaust gas with the hydrogen gas, and discharges the mixed hydrogen gas to the downstream side.

A second bypass flow path 166, which detours to avoid the ejector 162, is installed in the second supply flow path 154. One end (an upstream end) of the second bypass flow path 166 is connected between the check valve 160 and the ejector 162 in the second supply flow path 154. Another end of the second bypass flow path 166 is connected to a more downstream side than the ejector 162 in the second supply flow path 154.

An injector 168 is installed in the second bypass flow path 166. In particular, the ejector 162 and the injector 168 are arranged in parallel with each other. The injector 168 is a solenoid valve that is capable of adjusting the flow rate of the hydrogen gas that flows through the second bypass flow path 166.

The hydrogen lead-out unit 156 includes a second lead-out flow path 170, a second gas-liquid separator 172, an intermediate lead-out flow path 174, a hydrogen exhaust gas circulation flow path 176, a dehumidifying flow path 178, and a storage flow path 180. The second lead out flow path 170 connects the second outlet port member 58b and the second gas-liquid separator 172 to each other. At the time of the water electrolysis mode, the product hydrogen gas is led out from the second outlet port member 58b to the second lead-out flow path 170. At the time of the electricity generating mode, the hydrogen exhaust gas is let out to the second lead-out flow path 170.

A purge flow path 182 in order to guide the hydrogen exhaust gas into the second chamber 86b of the first storage unit 86 at the time of the electricity generating mode is connected to the second lead-out flow path 170. A purge valve 184 and a check valve 186 are installed in the purge flow path 182 sequentially in this order from the second lead-out flow path 170 toward the first storage unit 86. The purge valve 184 is an opening/closing valve that opens and closes the purge flow path 182. The check valve 186 permits the flow of the hydrogen exhaust gas from the second lead-out flow path 170 to the first storage unit 86, and blocks the flow of the fluid from the first storage unit 86 to the second lead-out flow path 170.

The second gas-liquid separator 172 separates into a gas and a liquid the product hydrogen gas which is guided from the second lead-out flow path 170 and the hydrogen exhaust gas which is guided from the second lead-out flow path 170. The second gas-liquid separator 172 includes the second storage unit 188 for storing the water that has been separated from the product hydrogen gas and the hydrogen exhaust gas. Inside the second storage unit 188, there is installed a non-illustrated swirl guide in order to generate a spiral flow in the product hydrogen gas and the hydrogen exhaust gas that are introduced into the second storage unit 188. Consequently, separation of the product hydrogen gas and the hydrogen exhaust gas, which are introduced into the second storage unit 188, into a gas and a liquid is efficiently performed.

A second water level sensor LS2 (second water level acquisition unit) for acquiring the amount of water inside the second storage unit 188 is installed in the second storage unit 188. A drain flow path 190 in order to drain the water in the second storage unit 188 is connected to a bottom surface of the second storage unit 188. The drain flow path 190 is connected between the purge valve 184 and the check valve 186 in the purge flow path 182. A drain valve 192 that opens and closes the drain flow path 190 is installed in the drain flow path 190.

The intermediate lead-out flow path 174 is connected to an upper part of the second storage unit 188. The product hydrogen gas and the hydrogen exhaust gas from which the water has been separated inside the second storage unit 188 are led out to the intermediate lead-out flow path 174. The hydrogen exhaust gas circulation flow path 176 and the dehumidifying flow path 178 are connected to the intermediate lead-out flow path 174 via a third flow path switching valve 194. The third flow path switching valve 194 is capable of switching between a flow through state of the hydrogen exhaust gas circulation flow path 176 and a flow through state of the dehumidifying flow path 178.

In the flow through state of the hydrogen exhaust gas circulation flow path 176, the third flow path switching valve 194 permits the flow of the hydrogen exhaust gas from the intermediate lead-out flow path 174 to the hydrogen exhaust gas circulation flow path 176, together with blocking the flow of the hydrogen exhaust gas from the intermediate lead-out flow path 174 to the dehumidifying flow path 178. In the flow through state of the dehumidifying flow path 178, the third flow path switching valve 194 permits the flow of the product hydrogen gas from the intermediate lead-out flow path 174 to the dehumidifying flow path 178, together with blocking the flow of the product hydrogen gas from the intermediate lead-out flow path 174 to the hydrogen exhaust gas circulation flow path 176. A three-way valve, for example, is preferably used as the third flow path switching valve 194.

The hydrogen exhaust gas circulation flow path 176 connects the third flow path switching valve 194 and the ejector 162 to each other. A check valve 196 is installed in the hydrogen exhaust gas circulation flow path 176. The check valve 196 permits the flow of the hydrogen exhaust gas from the third flow path switching valve 194 to the ejector 162, together with blocking the flow of the hydrogen gas from the ejector 162 to the third flow path switching valve 194.

The dehumidifying flow path 178 connects the third flow path switching valve 194 and the storage flow path 180 to each other. A dehumidifying and cooling unit 198, a first dehumidifying adsorption unit 200*a*, a second dehumidifying adsorption unit 200*b*, and a dehumidification switching unit 202 are installed in the dehumidifying flow path 178.

The dehumidifying and cooling unit 198 dehumidifies by cooling the product hydrogen gas. The first dehumidifying adsorption unit 200*a* is installed more downstream than the dehumidifying and cooling unit 198 in the dehumidifying flow path 178. The second dehumidifying adsorption unit 200*b* is installed more downstream than the first dehumidifying adsorption unit 200*a* in the dehumidifying flow path 178. The first dehumidifying adsorption unit 200*a* and the second dehumidifying adsorption unit 200*b* are dehumidifying and adsorption columns including an adsorbent such as zeolite. The first dehumidifying adsorption unit 200*a* and the second dehumidifying adsorption unit 200*b* include non-illustrated heaters for restoring the adsorption function of the adsorbent. More specifically, the first dehumidifying adsorption unit 200*a* and the second dehumidifying adsorption unit 200*b* are capable of dehumidifying the product hydrogen gas and restoring the dehumidifying function thereof.

The dehumidification switching unit 202 changes the direction in which the product hydrogen gas flows, in a manner so that the order in which the product hydrogen gas flows through the first dehumidifying adsorption unit 200*a* and the second dehumidifying adsorption unit 200*b* is changed. The dehumidification switching unit 202 includes a fourth flow path switching valve 204, a first switching flow path 206, a first opening/closing valve 208, a second switching flow path 210, and a second opening/closing valve 212.

The fourth flow path switching valve 204 is installed in the dehumidifying flow path 178 between the dehumidifying and cooling unit 198 and the first dehumidifying adsorption unit 200*a*. The dehumidifying flow path 178 includes a dehumidifying upstream flow path 178*a* on an upstream side of the fourth flow path switching valve 204, and a dehumidifying downstream flow path 178*b* on a downstream side of the fourth flow path switching valve 204. The first switching flow path 206 is connected to the fourth flow path switching valve 204.

The fourth flow path switching valve 204 is capable of switching between a flow through state of the dehumidifying downstream flow path 178*b* and a flow through state of the first switching flow path 206. In the flow through state of the dehumidifying downstream flow path 178*b*, the fourth flow path switching valve 204 permits the flow of the product hydrogen gas from the dehumidifying upstream flow path 178*a* to the dehumidifying downstream flow path 178*b*, together with blocking the flow of the product hydrogen gas from the dehumidifying upstream flow path 178*a* to the first switching flow path 206. In the flow through state of the first switching flow path 206, the fourth flow path switching valve 204 permits the flow of the product hydrogen gas from the dehumidifying upstream flow path 178*a* to the first switching flow path 206, together with blocking the flow of the product hydrogen gas from the dehumidifying upstream flow path 178*a* to the dehumidifying downstream flow path 178*b*. A three-way valve, for example, is preferably used as the fourth flow path switching valve 204.

The first switching flow path 206 is connected on a more downstream side than the second dehumidifying adsorption unit 200*b* in the dehumidifying downstream flow path 178*b*. The first opening/closing valve 208 is installed in the dehumidifying downstream flow path 178*b* on a more downstream side than a connected part of the first switching flow path 206. The first opening/closing valve 208 opens and closes the dehumidifying downstream flow path 178*b*. One end of the second switching flow path 210 is connected on a more upstream side than the first dehumidifying adsorption unit 200*a* in the dehumidifying downstream flow path 178*b*. Another end of the second switching flow path 210 is connected on a more downstream side than the first opening/closing valve 208 in the dehumidifying downstream flow path 178*b*. The second opening/closing valve 212 opens and closes the second switching flow path 210.

The storage flow path 180 guides the dehumidified product hydrogen gas that is guided from the dehumidifying flow path 178 to the supply and discharge flow path 150. A mesh filter 214 and a second back pressure valve 216 are installed in the storage flow path 180 sequentially in this order from the dehumidifying flow path 178 toward the supply and discharge flow path 150. The mesh filter 214 removes foreign matter from the product hydrogen gas. The second back pressure valve 216 regulates the flow rate of the product hydrogen gas that flows through the storage flow path 180. A diaphragm valve, for example, is preferably used as the second back pressure valve 216.

A vent flow path 218 is connected within the storage flow path 180 on a more upstream side than the mesh filter 214 and the second back pressure valve 216. The vent flow path 218 discharges the product hydrogen gas that is guided from the dehumidifying flow path 178 to the exhaust gas flow path 90. A vent valve 220 and a check valve 222 are installed in the vent flow path 218 sequentially in this order from the storage flow path 180 toward the exhaust gas flow path 90. The vent valve 220 serves to open and close the vent flow path 218. The check valve 222 permits the flow of the product hydrogen gas from the storage flow path 180 to the exhaust gas flow path 90, together with blocking the flow of the fluid from the exhaust gas flow path 90 to the storage flow path 180.

At the time of the electricity generating mode, the cooling device 18 cools the cell member 12 by circulating the coolant through the coolant flow path 48 of the cell member 12 (refer to FIG. 3). An ethylene glycol aqueous solution, for example, is preferably used as the coolant.

The cooling device 18 includes a coolant supply flow path 224, a coolant lead-out flow path 226, and a coolant radiator 228. The coolant supply flow path 224 connects the coolant radiator 228 and the coolant inlet port member 60*a* to each other. A coolant pump 230 is provided in the coolant supply flow path 224. The coolant pump 230 discharges the coolant in the coolant supply flow path 224 toward the coolant inlet port member 60*a*. The coolant lead-out flow path 226 connects the coolant outlet port member 60*b* and the coolant radiator 228 to each other.

A third back pressure valve 232 that adjusts the flow rate of the coolant that flows through the coolant lead-out flow path 226 is installed in the coolant lead-out flow path 226. A diaphragm valve, for example, is preferably used as the third back pressure valve 232. The coolant radiator 228 carries out heat exchange between the coolant and the atmosphere. The coolant radiator 228 adjusts the temperature of the coolant by adjusting the rotational speed of a non-illustrated fan.

Although illustration thereof is omitted, the cooling device 18 further includes a coolant tank and a pressure regulating valve and the like in order to adjust the flow rate of the coolant inside the coolant supply flow path 224, the coolant lead-out flow path 226, and the coolant flow path 48.

The water electrolysis and electricity generating system 10 further comprises a gas meter 234 (flow rate acquisition unit) and a system ECU 236. The gas meter 234 is installed in the supply and discharge flow path 150. The gas meter 234 acquires the flow rate of the product hydrogen gas (a sales amount of the hydrogen gas) that flows from the supply and discharge flow path 150 to the low pressure hydrogen pipeline 402, and the flow rate of the hydrogen gas (a purchase amount of the hydrogen gas) that flows from the low pressure hydrogen pipeline 402 to the supply and discharge flow path 150.

Figure 4:
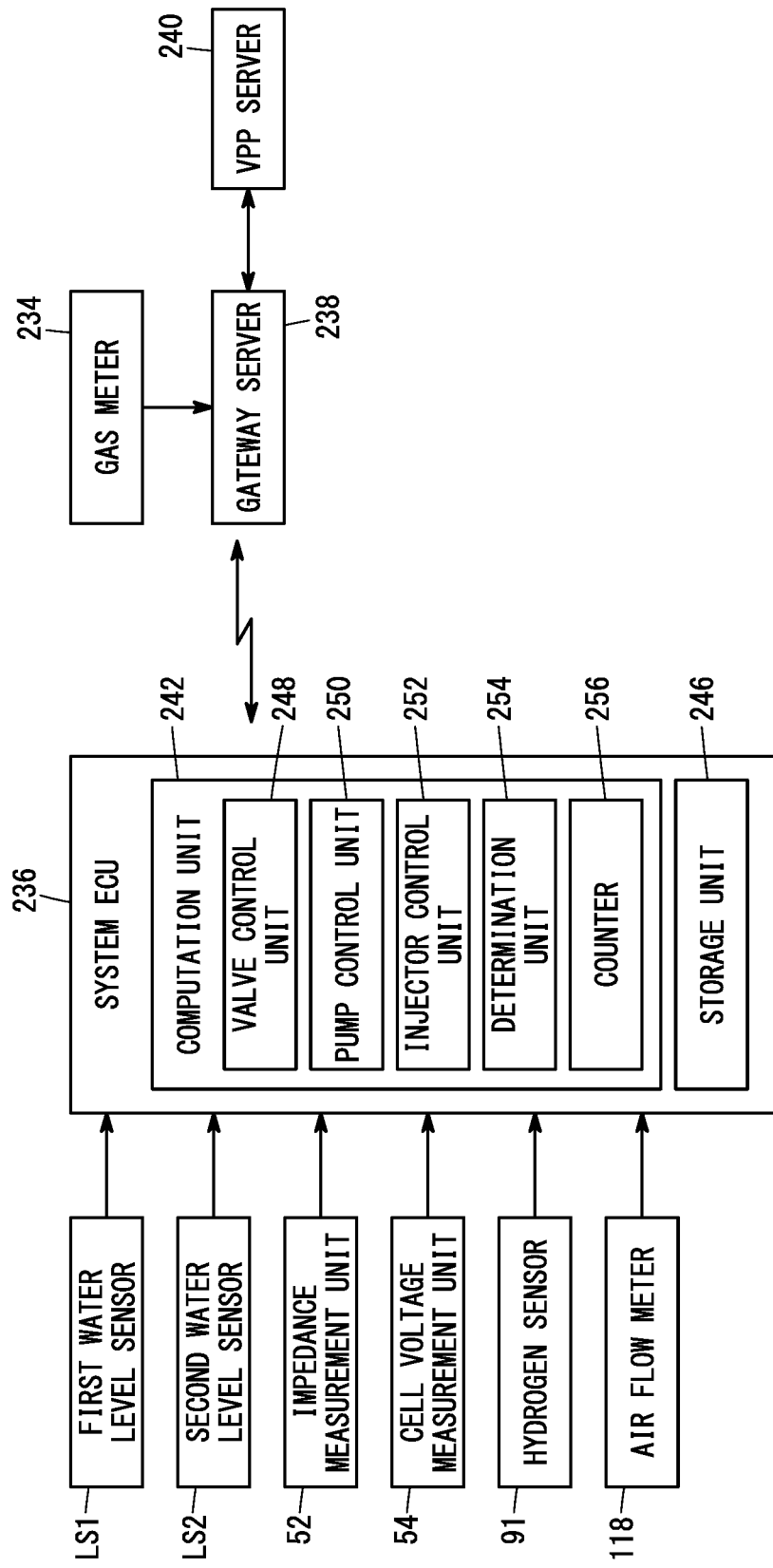
FIG. 4 is a block diagram of a system ECU shown in FIG. 2.

As shown in FIG. 4, the information acquired by the gas meter 234 is transmitted to a gateway server 238. The gateway server 238 transmits transaction information (the hydrogen gas sales amount and the hydrogen gas purchase amount) to which a time stamp is affixed to a VPP server 240 (virtual power plant server). The system ECU 236 is capable of communicating with the VPP server 240 via the gateway server 238. The VPP server 240 transmits a water electrolysis mode operation request, an electricity generating mode operation request, a mode switching request, a driving stop request, and the like to the system ECU 236 via the gateway server 238.

The system ECU 236 receives the acquired information of the first water level sensor LS1, the second water level sensor LS2, the impedance measurement unit 52, the cell voltage measurement unit 54, the hydrogen sensor 91, and the air flow meter 118. Further, the system ECU 236 receives the acquired information of various sensors such as a pressure sensor, a temperature sensor, a specific resistance meter, a hydrogen sensor, and a flow rate meter, etc., included in the cell member 12, the first device 14, the second device 16, and the cooling device 18.

The system ECU 236 comprises a computation unit 242 (processing unit) and a storage unit 246. The computation unit 242 may be configured, for example, in the form of a processing circuit which is a processor such as a CPU (Central Processing Unit) or the like. The computation unit 242 includes a valve control unit 248, a pump control unit 250, an injector control unit 252, a determination unit 254, and a counter 256. The respective elements (the valve control unit 248, etc.) of the computation unit 242 can be realized by programs stored in the storage unit 246 being executed by the computation unit 242.

At least a portion of the respective elements (the valve control unit 248, etc.) of the computation unit 242 may be realized by an integrated circuit such as an ASIC (Application Specific Integrated Circuit), an FPGA (Field-Programmable Gate Array), or the like. Further, at least a portion of the respective elements (the valve control unit 248, etc.) of the computation unit 242 may include an electronic circuit including a discrete device.

The storage unit 246 includes a volatile memory and a non-volatile memory. As an example of the volatile memory, there may be cited a RAM (Random Access Memory) or the like. As an example of the non-volatile memory, there may be cited a ROM (Read Only Memory) or a flash memory or the like. At least a portion of the storage unit 246 may be incorporated in the aforementioned processor or the integrated circuit or the like.

The valve control unit 248 controls operations of the various valves. The pump control unit 250 controls operations of the various pumps (the water pump 94, the air pump 116, the heating medium pump 144, and the coolant pump 230). The injector control unit 252 controls valve opening and valve closing of the injector 168. The counter 256 serves to measure the time.

Next, a description will be given concerning a method of operating the water electrolysis and electricity generating system 10.

First, a description will be given concerning operations of the water electrolysis and electricity generating system 10 in the water electrolysis mode. In the case that the water electrolysis mode operation request has been made to the system ECU 236 from the VPP server 240 via the gateway server 238, the water electrolysis and electricity generating system 10 carries out operations in the water electrolysis mode.

More specifically, as shown in FIG. 5, during operation in the water electrolysis mode, pure water is produced from the municipal water (step S1). In particular, the valve control unit 248 opens the municipal water supply valve 72. Upon doing so, as shown in FIG. 6, the municipal water passes through the water supply flow path 70 and is introduced into the pure water production unit 74. In the pure water production unit 74, the pure water is produced by flowing through an activated carbon filter, an ion exchange resin, and a hollow fiber filter, none of which are shown. The pure water produced in the pure water production unit 74 is introduced into the first storage unit 86 via the pure water regulating valve 76. The pure water supplied into the first storage unit 86 is mixed inside the first storage unit 86 with the water that was used at the time of water electrolysis of the cell member 12.

Further, at the time of the water electrolysis mode, the valve control unit 248 opens and closes the pure water regulating valve 76 based on the water level acquired by the first water level sensor LS1 in a manner so that the water level in the first storage unit 86 is maintained within a predetermined range. More specifically, in the case that the water level acquired by the first water level sensor LS1 has fallen to a lower limit level, the valve control unit 248 opens the pure water regulating valve 76, and supplies the pure water into the first storage unit 86 from the pure water production unit 74. Subsequently, in the case that the water level acquired by the first water level sensor LS1 has risen to a reference level, the valve control unit 248 closes the pure water regulating valve 76, and stops supplying the pure water into the first storage unit 86 from the pure water production unit 74. Furthermore, in the case that the water level acquired by the first water level sensor LS1 has risen to an upper limit level, the valve control unit 248 opens a drain valve installed in a non-illustrated drain flow path connected to the bottom surface of the first storage unit 86, and discharges the water inside the first storage unit 86 to the exterior.

Moreover, the system ECU 236 carries out a failure stopping process in the case that the water level acquired by the first water level sensor LS1 has risen to an abnormal water level upper limit level. Further, the system ECU 236 carries out the failure stopping process in the case that the water level acquired by the first water level sensor LS1 has fallen to an abnormal water level lower limit level. The lower limit level, the reference level, the upper limit level, the abnormal upper limit level, and the abnormal lower limit level of the water level inside the first storage unit 86 are stored beforehand in the storage unit 246.

Subsequently, the valve control unit 248 controls the various valves to place them in the water electrolysis mode state (step S2 of FIG. 5). More specifically, the valve control unit 248 opens the pure water supply valve 100, the first opening/closing valve 208, and the second back pressure valve 216. Further, the valve control unit 248 closes the hydrogen gas supply valve 158, the purge valve 184, the drain valve 192, the second opening/closing valve 212, and the vent valve 220. Moreover, the first back pressure valve 138 and the third back pressure valve 232 may be either open or closed.

Further, the valve control unit 248 controls the flow rate control valve 128 to bring about a state in which, together with the oxygen-containing gas flowing through the first bypass flow path 126, the oxygen-containing gas does not flow through the humidifier 124. Furthermore, the valve control unit 248 controls the first flow path switching valve 130 to bring about the flow through state of the dilution flow path 110. The valve control unit 248 controls the second flow path switching valve 136 to bring about the flow through state of the downstream side lead-out flow path 84b. The valve control unit 248 controls the third flow path switching valve 194 to bring about the flow through state of the dehumidifying flow path 178. The valve control unit 248 controls the fourth flow path switching valve 204 to bring about the flow through state of the dehumidifying downstream flow path 178b.

Next, the pump control unit 250 controls the various pumps to place them in the water electrolysis mode state (step S3 of FIG. 5). More specifically, the pump control unit 250 drives the water pump 94, the heating medium pump 144, and the air pump 116. Moreover, the pump control unit 250 does not drive the coolant pump 230. However, in the case that the exterior air is in a high temperature environment (for example, 45° C. or higher), the pump control unit 250 may drive the coolant pump 230 and thereby cool the cell member 12.

Upon doing so, the water that is stored in the first storage unit 86 passes through the water introduction flow path 81, and is supercharged by the water pump 94 after the foreign matter has been removed therefrom by the strainer 92. The water that is supercharged by the water pump 94 is adjusted to a desired temperature by carrying out heat exchange with the heating medium in the first heat exchanger 96.

Concerning the water that has flowed through the first heat exchanger 96, after passing through the ion exchangers 102 and being subjected to a water purifying treatment, foreign matter is removed therefrom by the mesh filter 104. Next, the water (pure water) that has flowed through the mesh filter 104 is supplied to the first inlet port member 56a of the cell member 12 via the first supply flow path 82 (step S4 of FIG. 5). Moreover, the system ECU 236 carries out the failure stopping process in the case that the specific resistance of the water (pure water), as measured at a position on a downstream side of the mesh filter 104 in the water introduction flow path 81, has fallen below a lower limit level.

The pure water that is introduced into the first inlet port member 56a flows through the first fluid flow path 44 of the cell member 12 and is guided to the first electrode 30. When operating in the water electrolysis mode, since the hydrogen gas supply valve 158 is closed, the hydrogen gas is not introduced into the second inlet port member 58a of the cell member 12.

Further, the oxygen-containing gas that has flowed into the oxygen-containing gas flow path 106 is supercharged by the air pump 116 after the foreign matter has been removed therefrom by the air filter 114. The oxygen-containing gas which has been raised in temperature due to supercharging flows through the air flow meter 118, and after having been cooled by the intercooler 120, is adjusted to a desired temperature by the second heat exchanger 122.

The oxygen-containing gas that has flowed through the second heat exchanger 122 passes through the first bypass flow path 126 and is guided to the dilution flow path 110. In particular, in the water electrolysis mode, the oxygen-containing gas does not flow through the humidifier 124. Therefore, at the time of the water electrolysis mode, it is possible to prevent the humidifier 124 from becoming dried up by the oxygen-containing gas. Consequently, at a time when switching from operating in the water electrolysis mode to operating in the electricity generating mode, and immediately after the generation of electricity has been started, the amount by which the oxygen-containing gas is humidified can be efficiently adjusted by the humidifier 124. The oxygen-containing gas that is guided to the dilution flow path 110 is introduced into the second chamber 86b of the first storage unit 86.

Thereafter, the system ECU 236 initiates water electrolysis (step S5 of FIG. 5). In particular, the system ECU 236 drives the electrolytic power source 50 and applies a voltage to the cell member 12. Upon doing so, at the first electrode 30 of each of the cells 20, pure water is electrolyzed to thereby generate hydrogen ions, electrons, and oxygen gas. At the second electrode 32 of each of the cells 20, the hydrogen ions, which have permeated through the electrolyte membrane 28 from the first electrode 30, and electrons, which have been guided from the first electrode 30 to the second electrode 32, are combined to produce hydrogen gas. At this time, a portion of the product hydrogen gas produced at the second electrodes 32 permeates through the electrolyte membranes 28 and is guided to the first fluid flow path 44.

Therefore, gas-containing water, in which there are included oxygen gas generated due to the reaction, unreacted water that has not been subjected to electrolysis, and generated hydrogen that has permeated from the second electrodes 32 to the first electrodes 30 via the electrolyte membranes 28, is introduced into the first outlet port member 56b. Further, the product hydrogen gas is guided to the second outlet port member 58b. Moreover, the product hydrogen gas is also guided to the second inlet port member 58a. However, since the check valve 160 is installed in the second supply flow path 154, the product hydrogen gas that is guided to the second inlet port member 58a does not flow into the supply and discharge flow path 150. Further, since the check valve 196 is installed in the hydrogen exhaust gas circulation flow path 176, the product hydrogen gas that is guided to the second inlet port member 58a does not flow into the third flow path switching valve 194.

The gas-containing water that is guided to the first outlet port member 56b of the cell member 12 flows into the first gas-liquid separator 80 via the first lead-out flow path 84. More specifically, the gas-containing water flows into the second chamber 86b of the first storage unit 86. Further, the oxygen-containing gas is introduced from the dilution flow path 110 into the second chamber 86b of the first storage unit 86. Therefore, the oxygen-containing gas in the second chamber 86b passes within the water that is stored in the first storage unit 86 (via a route between the partition wall 88 and the bottom surface of the first storage unit 86) and flows into the first chamber 86a. At this time, the gas component contained within the gas-containing water is also guided to the first chamber 86a. Stated otherwise, the gas component that is separated from the gas-containing water flows into the first chamber 86a, and the water (liquid water) that is separated from the gas-containing water is stored in the first storage unit 86. Next, the gas component that has flowed into the first chamber 86*a*, in a state of being diluted by the oxygen-containing gas, is exhausted to the exterior through the exhaust gas flow path 90.

The product hydrogen gas that is guided to the second outlet port member 58*b* of the cell member 12 flows into the second gas-liquid separator 172 via the second lead-out flow path 170. At this time, since the purge valve 184 is closed, the product hydrogen gas that flows through the second lead-out flow path 170 is not guided to the first gas-liquid separator 80 via the purge flow path 182.

The product hydrogen gas that is guided to the second gas-liquid separator 172 flows in a spiral shape inside the second storage unit 188, and is separated into a gas and a liquid. The water (liquid water) that has been separated from the product hydrogen gas is stored in the second storage unit 188. The product hydrogen gas from which the water has been separated is guided to the intermediate lead-out flow path 174.

The product hydrogen gas that is guided to the intermediate lead-out flow path 174 flows into the dehumidifying flow path 178 via the third flow path switching valve 194 and is dehumidified. More specifically, the product hydrogen gas, which has flowed into the dehumidifying upstream flow path 178*a* from the third flow path switching valve 194, is cooled and dehumidified by the dehumidifying and cooling unit 198. Thereafter, the product hydrogen gas is guided from the dehumidifying upstream flow path 178*a* to the dehumidifying downstream flow path 178*b* via the fourth flow path switching valve 204. The product hydrogen gas, which is guided to the dehumidifying downstream flow path 178*b*, flows sequentially in this order through the first dehumidifying adsorption unit 200*a* and the second dehumidifying adsorption unit 200*b*, and then flows into the storage flow path 180. At this time, the product hydrogen gas is adsorbed and dehumidified by the first dehumidifying adsorption unit 200*a* and the second dehumidifying adsorption unit 200*b*. In this case, for example, the residual water content of the product hydrogen gas can be controlled to be less than a predetermined value, by carrying out a restorative process (self-regeneration) to restore the adsorption function of the first dehumidifying adsorption unit 200*a* and the second dehumidifying adsorption unit 200*b*.

The product hydrogen gas that has flowed into the storage flow path 180, after the foreign matter has been removed therefrom by the mesh filter 214, is led out to the low pressure hydrogen pipeline 402 via the second back pressure valve 216 and the supply and discharge flow path 150. Moreover, the valve control unit 248 feedback controls the second back pressure valve 216 in a manner so that the pressure of the product hydrogen gas at a position in the vicinity of the upstream side of the second back pressure valve 216 in the storage flow path 180 becomes greater than or equal to a predetermined transport pressure.

At this time, the gas meter 234 acquires the flow rate of the product hydrogen gas (the sales amount of the product hydrogen gas) that flows from the supply and discharge flow path 150 into the low pressure hydrogen pipeline 402, and transmits the acquired amount to the VPP server 240 via the gateway server 238. Consequently, the series of operation flows that describe the water electrolysis mode of the water electrolysis and electricity generating system 10 are brought to an end.

During operation in the above-described water electrolysis mode, the heating medium (the antifreeze) that flows through the first heat exchanger 96 carries out heat exchange directly with the exterior air by the heating medium radiator 146. Stated otherwise, in the first heat exchanger 96, the water transferred by the water pump 94 does not carry out heat exchange directly with the exterior air. Therefore, even if the exterior air is below the freezing point, it is possible to prevent the water in the first supply flow path 82 from freezing. Further, according to the present embodiment, the water circulation unit 64 is installed together with the cell member 12 in a non-illustrated housing having an explosion-proof ventilation and heat-retaining function. Consequently, even if the temperature of the exterior air is below the freezing point, it is possible to prevent freezing of the water by supercooling and enhance the temperature control characteristics.

The pump control unit 250 feedback controls the rotational speed (the circulating flow rate of the heating medium) of the heating medium pump 144 in a manner so that the temperature of the gas-containing water that is led out from the first outlet port member 56*b* of the cell member 12 lies within a predetermined temperature range. Consequently, even if the cell member 12 rises to an excessive voltage and the amount of heat increases accompanying deterioration over time, the temperature of the cell member 12 can be kept within an upper limit of the operating temperature. Moreover, in the case that the temperature of the heating medium temperature at the outlet of the heating medium radiator 146 falls below a preset lower limit temperature (for example, $-25°$ C.), the system ECU 236 carries out the failure stopping process without activating the heating medium pump 144. Further, similarly, the system ECU 236 also performs the failure stopping process in the case that the water temperature at the outlet of the first heat exchanger 96 has become lower than a predicted freezing temperature (for example, $1°$ C.). This is because, if the exterior air temperature is too low, the water may become frozen inside the first heat exchanger 96, even if the flow rate of the heating medium is reduced.

Further, the heating medium that flows through the second heat exchanger 122 is guided to the first heat exchanger 96 on a more downstream side than the air pump 116, in a state of having been warmed by the exhaust heat of the oxygen-containing gas that is supercharged by the air pump 116. Therefore, even in the case that the exterior air is below the freezing point, the first heat exchanger 96 is capable of effectively suppressing freezing of the water that flows through the first supply flow path 82.

The pump control unit 250 feedback controls the rotational speed of the air pump 116 in a manner so that the supplied flow rate of the oxygen-containing gas acquired by the air flow meter 118 becomes a dilution flow rate. The dilution flow rate is a flow rate such that the concentration of the hydrogen gas in the vicinity of the outlet of the first storage unit 86 in the exhaust gas flow path 90 does not exceed an upper limit value.

The air pump 116 functions as a dilution pump in the water electrolysis mode. Further, as will be discussed later, the air pump 116 also functions as a pump for supplying the oxygen gas in the electricity generating mode. In this case, since the air pump 116 is capable of ensuring a dilution flow rate equivalent to that at a time of maximum rated electricity generation, in the water electrolysis mode, the concentration of the hydrogen gas that is discharged from the first gas-liquid separator 80 can be reliably controlled to be less than an upper limit value. Moreover, the system ECU 236 stops operation of the water electrolysis mode in the case that the concentration of hydrogen gas discharged from the first gas-liquid separator 80 becomes greater than or equal to the upper limit value.

In the case that the water level acquired by the second water level sensor LS2 has risen to an upper limit level, the valve control unit 248 opens the drain valve 192, and discharges the water inside the second storage unit 188 into the second chamber 86b of the first storage unit 86. Next, in the case that the water level acquired by the second water level sensor LS2 has fallen to the lower limit level, the valve control unit 248 closes the drain valve 192 and terminates the water drainage process of the second storage unit 188.

Further, the system ECU 236 carries out a failure stopping process in the case that the water level acquired by the second water level sensor LS2 has risen to an abnormal water level upper limit level. Furthermore, the system ECU 236 carries out the failure stopping process in the case that the water level acquired by the second water level sensor LS2 has fallen to an abnormal water level lower limit level. Even in the case that a portion of the product hydrogen gas inside the second storage unit 188 blows into the second chamber 86b of the first storage unit 86, the product hydrogen gas that has flowed into the first storage unit 86 is released to the atmosphere in a fully diluted state due to the oxygen-containing gas. The lower limit level, the upper limit level, the abnormal upper limit level, and the abnormal lower limit level of the water level inside the second storage unit 188 are stored beforehand in the storage unit 246.

Figure 7:
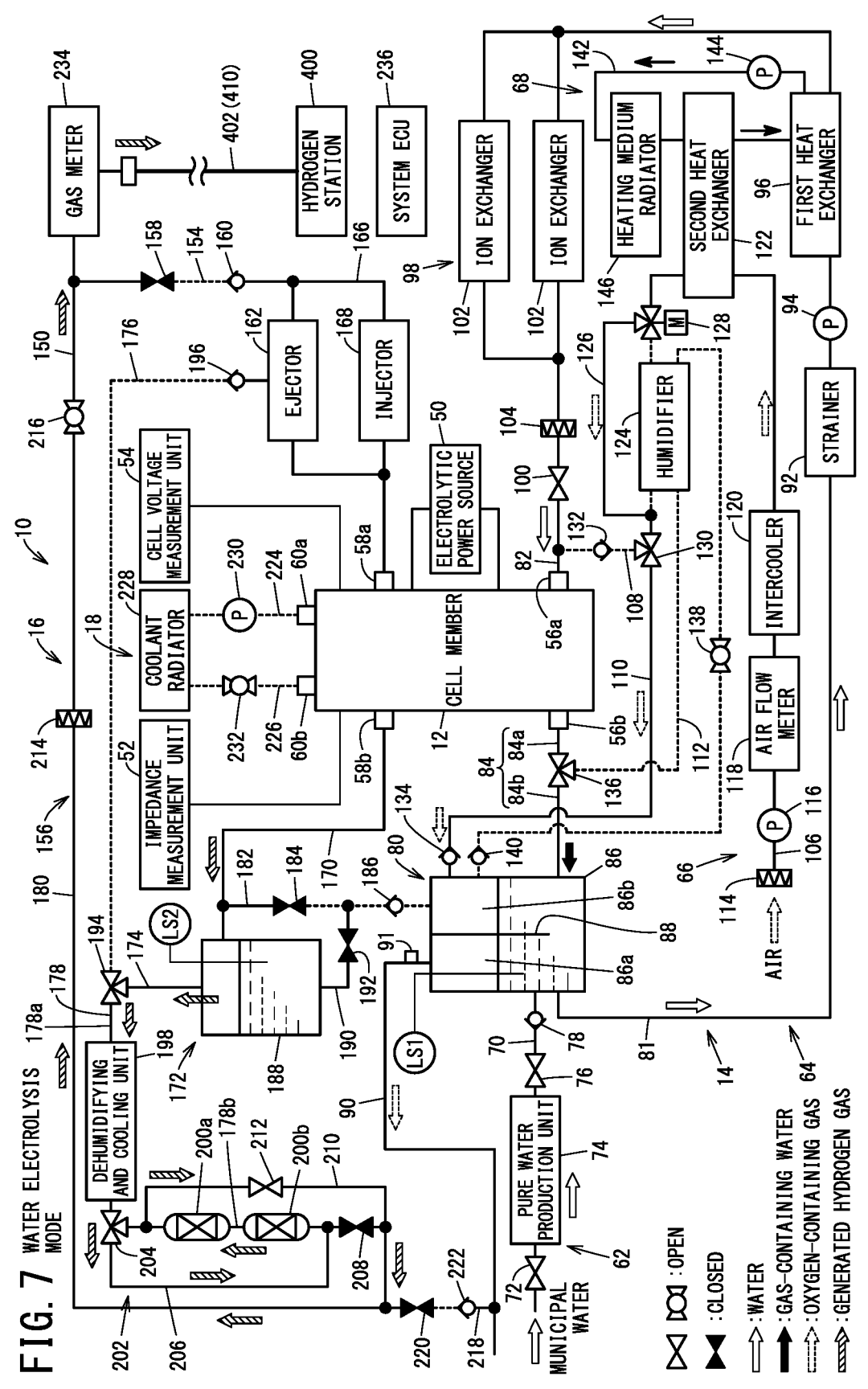

According to the present embodiment, the flow of the product hydrogen gas is switched in a manner so that the order in which the product hydrogen gas flows through the first dehumidifying adsorption unit 200a and the second dehumidifying adsorption unit 200b is changed. More specifically, as shown in FIG. 7, during operation of the water electrolysis mode, the valve control unit 248 controls the fourth flow path switching valve 204 to bring about the flow through state of the first switching flow path 206, and together with closing the first opening/closing valve 208, opens the second opening/closing valve 212. Upon doing so, the product hydrogen gas, which is guided from the dehumidifying upstream flow path 178a to the fourth flow path switching valve 204, is guided to the first switching flow path 206. The product hydrogen gas, which is guided to the first switching flow path 206, flows sequentially in this order through the second dehumidifying adsorption unit 200b and the first dehumidifying adsorption unit 200a, and then flows into the storage flow path 180 via the second switching flow path 210. At this time, the product hydrogen gas is adsorbed and dehumidified by the second dehumidifying adsorption unit 200b and the first dehumidifying adsorption unit 200a. In this manner, by changing the order in which the product hydrogen gas flows through the first dehumidifying adsorption unit 200a and the second dehumidifying adsorption unit 200b, the replacement interval of the dehumidifying adsorption units can be prolonged.

Next, a description will be given concerning the electricity generating mode of the water electrolysis and electricity generating system 10. In the case that the electricity generating mode operation request has been made to the system ECU 236 from the VPP server 240 via the gateway server 238, the water electrolysis and electricity generating system 10 carries out operations in the electricity generating mode.

Figure 8:
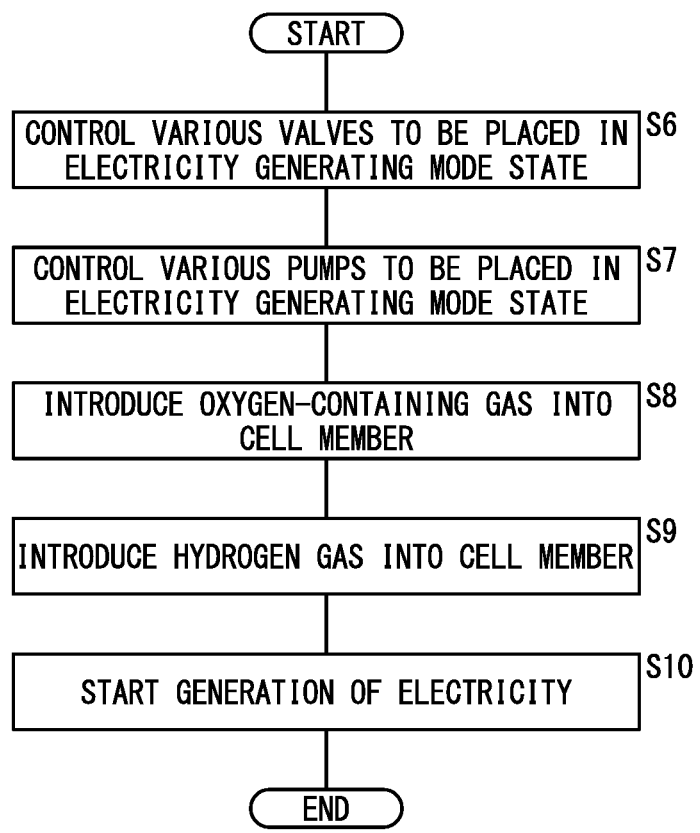
FIG. 8 is a flowchart illustrating an electricity generating mode of the water electrolysis and electricity generating system.
Figure 9:
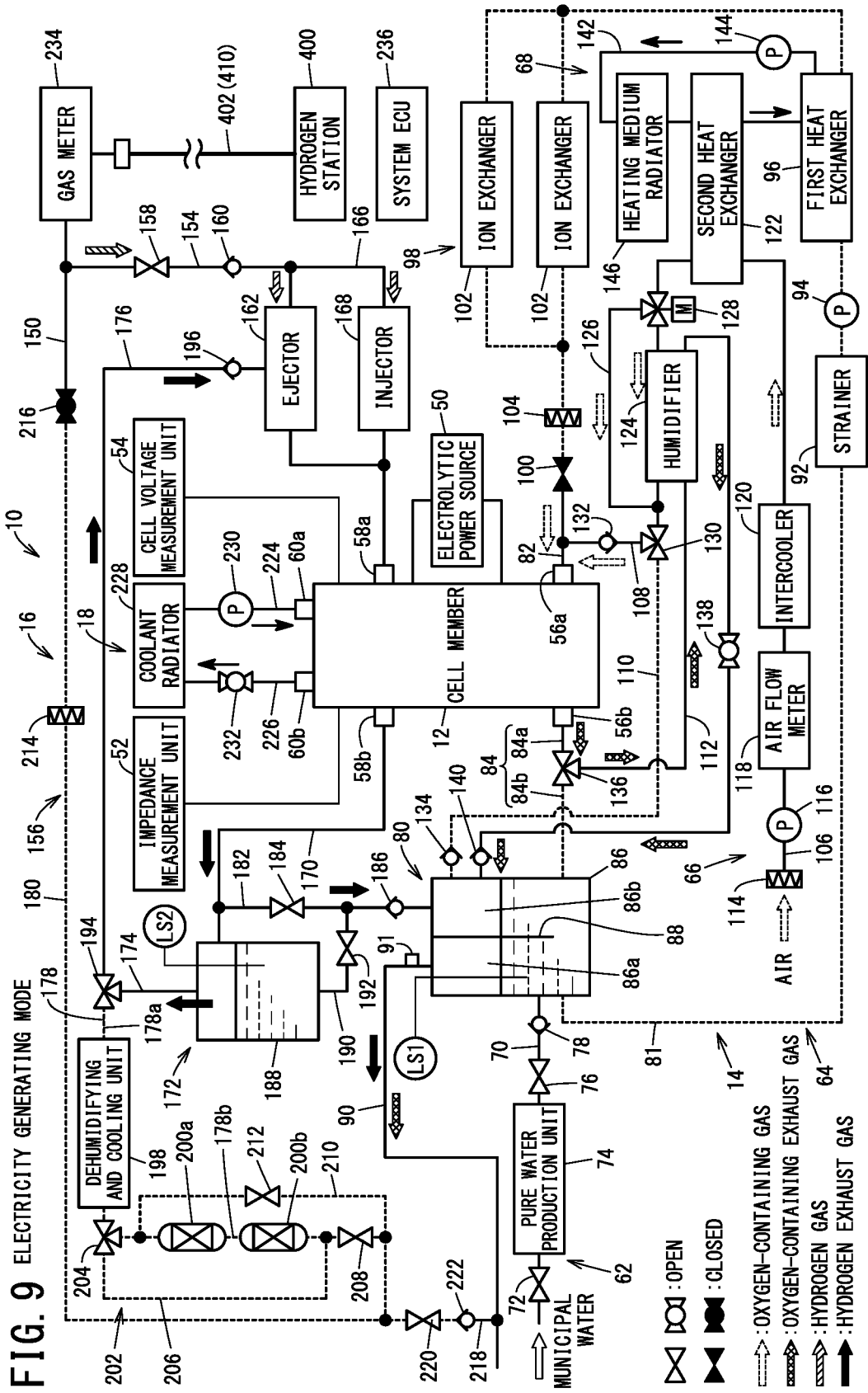
FIG. 9 is an explanatory diagram of operations in the electricity generating mode.

More specifically, as shown in FIG. 8, the valve control unit 248 controls the various valves in the electricity generating mode state (step S6). In particular, as shown in FIG. 9, the valve control unit 248 opens the first back pressure valve 138, the hydrogen gas supply valve 158, the purge valve 184, the drain valve 192, and the third back pressure valve 232. The valve control unit 248 closes the pure water supply valve 100 and the second back pressure valve 216.

Moreover, the first opening/closing valve 208, the second opening/closing valve 212, and the vent valve 220 may be either open or closed.

Further, by the valve control unit 248 controlling the flow rate control valve 128, the oxygen-containing gas is made to flow to the humidifier 124 and the first bypass flow path 126. Furthermore, the valve control unit 248 controls the first flow path switching valve 130 to bring about the flow through state of the oxygen-containing gas introduction flow path 108. The valve control unit 248 controls the second flow path switching valve 136 to bring about the flow through state of the oxygen-containing gas lead-out flow path 112. The valve control unit 248 controls the third flow path switching valve 194 to bring about the flow through state of the hydrogen exhaust gas circulation flow path 176. It is immaterial which flow through state the fourth flow path switching valve 204 is placed in.

Next, the pump control unit 250 controls the various pumps to place them in the electricity generating mode state (step S7 of FIG. 8). More specifically, the pump control unit 250 drives the air pump 116, the heating medium pump 144, and the coolant pump 230. Moreover, the pump control unit 250 does not drive the water pump 94. Further, in accordance with preset load conditions, the injector control unit 252 drives the injector 168 to be opened and closed in a valve opening time period and a valve closing time period.

Upon doing so, the oxygen-containing gas that has flowed into the oxygen-containing gas flow path 106 is supercharged by the air pump 116 on a more downstream side than the air pump 116 after the foreign matter has been removed therefrom by the air filter 114. The oxygen-containing gas which has been raised in temperature due to supercharging flows through the air flow meter 118, and after having been cooled by the intercooler 120, is adjusted to a desired temperature by the second heat exchanger 122.

The oxygen-containing gas that has flowed through the second heat exchanger 122 is made to flow separately through the humidifier 124 and the first bypass flow path 126 by the flow rate control valve 128, and the flows thereof are combined on a more downstream side than the humidifier 124 in the oxygen-containing gas flow path 106. Thereafter, the oxygen-containing gas is introduced into the first inlet port member 56a of the cell member 12 via the first flow path switching valve 130, the oxygen-containing gas introduction flow path 108, and the first supply flow path 82 (step S8 of FIG. 8).

Further, the hydrogen gas supplied from the hydrogen station 400 to the supply and discharge flow path 150 via the low pressure hydrogen pipeline 402 is introduced into the hydrogen gas supply valve 158 and the second supply flow path 154. Next, the check valve 160 is opened after the pressure inside the second supply flow path 154 has been held until becoming equivalent to the transport pressure in the low pressure hydrogen pipeline 402. At this time, the gas meter 234 acquires the flow rate (the purchase amount of the hydrogen gas) of the hydrogen gas supplied from the low pressure hydrogen pipeline 402 to the supply and discharge flow path 150, and transmits the acquired amount to the VPP server 240 via the gateway server 238.

The hydrogen gas that is guided to a more downstream side of the second supply flow path 154 than the check valve 160 is guided to the ejector 162 and the injector 168. The hydrogen gas that is discharged from the injector 168 and the hydrogen gas that is led out from the ejector 162 are mixed with each other and introduced into the second inlet port member 58a (step S9 in FIG. 8).

In the cell member 12, the oxygen-containing gas that is introduced into the first inlet port member 56a is supplied to the first fluid flow path 44. The hydrogen gas that is introduced into the second inlet port member 58a is supplied to the second fluid flow path 46. Thereafter, in each of the MEAs 22, the oxygen-containing gas supplied to the first electrode 30 and the hydrogen gas supplied to the second electrode 32 are consumed by undergoing electrochemical reactions in the first electrode catalyst layer 34 and the second electrode catalyst layer 38. As a result, generation of electricity is initiated (step S10 of FIG. 8). At this time, generated water is generated at the first electrode 30. Further, a portion of the generated water spreads from the first electrode 30 to the second electrode 32 via the MEA 22.

The oxygen containing exhaust gas (in which the generated water is included) in the first electrode 30 is led out to the first outlet port member 56b. The oxygen containing exhaust gas that is led out to the first outlet port member 56b is guided to the oxygen-containing gas lead-out flow path 112 via the upstream side lead-out flow path 84a and the second flow path switching valve 136. The oxygen containing exhaust gas that is guided to the oxygen-containing gas lead-out flow path 112 humidifies the oxygen-containing gas that flows through the oxygen-containing gas flow path 106 at the time of flowing through the humidifier 124. Thereafter, the oxygen containing exhaust gas flows through the first back pressure valve 138 and flows into the second chamber 86b of the first storage unit 86.

The hydrogen exhaust gas (including unreacted hydrogen gas and generated water) at the second electrode 32 is led out to the second outlet port member 58b. The hydrogen exhaust gas that is led out to the second outlet port member 58b flows through the second lead-out flow path 170 and is guided to the purge flow path 182 and the second gas-liquid separator 172. The hydrogen exhaust gas that is guided to the purge flow path 182 passes through the check valve 186 and flows into the second chamber 86b of the first storage unit 86. The hydrogen exhaust gas that has flowed into the second chamber 86b is diluted by the oxygen containing exhaust gas that has flowed into the second chamber 86b from the oxygen-containing gas lead-out flow path 112, together with being guided to the first chamber 86a via the route (within the water) between the partition wall 88 and the bottom surface of the first storage unit 86. Thereafter, the diluted oxygen containing exhaust gas is discharged to the exterior from the exhaust gas flow path 90. Consequently, the concentration of the hydrogen gas discharged from the water electrolysis and electricity generating system 10 when operating in the electricity generating mode can be controlled to be less than or equal to a predetermined value.

The hydrogen exhaust gas that has flowed into the second storage unit 188 of the second gas-liquid separator 172, by flowing in a spiral shape, is separated into a gas and a liquid. The hydrogen exhaust gas from which the water has been separated inside the second storage unit 188 is drawn into the ejector 162 via the intermediate lead-out flow path 174, the third flow path switching valve 194, and the hydrogen exhaust gas circulation flow path 176, whereby the hydrogen exhaust gas is reused in the cell member 12 for generating electricity. Consequently, self-humidification of the hydrogen gas is performed by the generated water within the hydrogen exhaust gas. Further, during operation in the electricity generating mode, the amount of hydrogen gas that is used can be reduced with respect to a unit amount of generated electricity of the cell member 12.

The coolant that is transferred by the coolant pump 230 is introduced from the coolant supply flow path 224 into the coolant inlet port member 60a of the cell member 12. The coolant that is introduced into the coolant inlet port member 60a flows through the coolant flow path 48 to cool the cell member 12, and then is led out to the coolant outlet port member 60b. The coolant that is led out to the coolant outlet port member 60b is guided to the coolant radiator 228 via the coolant lead-out flow path 226, carries out heat exchange with (is cooled by) the atmosphere, and then is returned to the coolant supply flow path 224. Consequently, the series of operation flows that describe the electricity generating mode of the water electrolysis and electricity generating system 10 are brought to an end.

During operation in the above-described electricity generating mode, the system ECU 236 feedback controls the rotational speed of a non-illustrated fan of the intercooler 120 in a manner so that the temperature of the oxygen-containing gas at the outlet of the intercooler 120 lies within a predetermined temperature range. Further, the heating medium (the antifreeze) that flows through the second heat exchanger 122 carries out heat exchange directly with the exterior air by the heating medium radiator 146. Stated otherwise, in the second heat exchanger 122, the oxygen-containing gas that is supercharged by the air pump 116 does not directly carry out heat exchange with the exterior air. Therefore, even if the exterior air is below the freezing point, by reducing the flow rate of the heating medium that flows through the heating medium circulation flow path 142, it is possible to prevent excessive cooling of the oxygen-containing gas and to improve the temperature control characteristics. Further, the pump control unit 250 feedback controls the rotational speed (the circulation flow rate of the heating medium) of the heating medium pump 144 in a manner so that the temperature of the oxygen-containing gas that is led out from the outlet of the second heat exchanger 122 lies within a predetermined range.

Further, the system ECU 236 calculates a contained water amount inside the cell member 12 from the hydrogen concentration acquired by the hydrogen sensor 91, an output requirement value of the cell member 12, and a DC resistance value of the cell member 12 acquired by the impedance measurement unit 52. Next, the pump control unit 250 feedback controls the rotational speed of the air pump 116 in a manner so that the contained water amount inside the cell member 12 becomes within a predetermined range, and further, the flow rate of the oxygen-containing gas acquired by the air flow meter 118 becomes a flow rate that is greater than or equal to a set stoichiometric value of a target load.

Furthermore, the valve control unit 248 controls the degree of opening of the flow rate control valve 128 (a flow rate ratio between the oxygen-containing gas flowing through the humidifier 124 and the oxygen-containing gas flowing through the first bypass flow path 126) in a manner so that drying up (a rise in resistance due to drying of the electrolyte membranes 28) of the cell member 12 does not occur.

Further, the valve control unit 248 feedback controls the first back pressure valve 138 in a manner so that, in the first supply flow path 82, the pressure of the oxygen-containing gas in the vicinity of the first inlet port member 56a of the cell member 12 lies within a predetermined range.

Furthermore, by the injector control unit 252 controlling the valve opening time period and the valve closing time period (a valve opening interval) of the injector 168 based on the target load of the cell member 12, the pressure of the hydrogen gas, and the temperature of the hydrogen gas, a desired stoichiometric setting value is brought about. The pressure of the hydrogen gas is a pressure of the hydrogen gas in the vicinity of the second inlet port member 58a in the second supply flow path 154. The temperature of the hydrogen gas is a temperature of the hydrogen gas in the vicinity of the second inlet port member 58a in the second supply flow path 154. The injector 168 introduces the hydrogen gas into the second inlet port member 58a of the cell member 12 as a pulse flow. Therefore, a differential pressure required for drainage inside the second fluid flow path 46 of the cell member 12 can be secured with a smaller amount of gas, compared to a steady flow. However, a pump in order to cause the hydrogen exhaust gas to circulate may be installed in the hydrogen exhaust gas circulation flow path 176, and the drainage of the second fluid flow path 46 may be assisted by such a pump.

Further, in the case that the water level acquired by the second water level sensor LS2 has risen to an upper limit level, the valve control unit 248 opens the drain valve 192, and discharges the water inside the second storage unit 188 into the second chamber 86b of the first storage unit 86. Next, in the case that the water level acquired by the second water level sensor LS2 has fallen to the lower limit level, the valve control unit 248 closes the drain valve 192 and terminates the water drainage process of the second storage unit 188. Further, the system ECU 236 carries out a failure stopping process in the case that the water level acquired by the second water level sensor LS2 has risen to an abnormal water level upper limit level. Furthermore, the system ECU 236 carries out the failure stopping process in the case that the water level acquired by the second water level sensor LS2 has fallen to an abnormal water level lower limit level.

During operation in the electricity generating mode, in the case that a deviation in the specified cell voltage variation of the cell member 12 has exceeded a threshold value, there is a possibility that the interior of the second fluid flow path 46 may become blocked by residual water. Further, in this case, there is a possibility that the hydrogen at the second electrode 32 may become insufficient due to nitrogen gas derived from the air that has passed through the electrolyte membrane 28 from the first fluid flow path 44. It should be noted that the deviation in the cell voltage variation is defined by a difference when a lowest cell voltage is subtracted from an average cell voltage of all of the cells 20. In this case, the valve control unit 248 intermittently opens the purge valve 184 to carry out purging of the second fluid flow path 46. Consequently, stable generation of electricity can be performed. At this time, the injector control unit 252 and the valve control unit 248 feedback control the valve opening time period and the valve closing time period (the valve opening interval) of the injector 168 and the purge valve 184 in a manner so that the pressure of the hydrogen gas in the vicinity of the second inlet port member 58a of the second supply flow path 154 is satisfied to lie within a fluctuating allowable deviation width of the operating pressure of the second inlet port member 58a under the preset load conditions.

Next, a description will be given concerning a process of switching from the water electrolysis mode to the electricity generating mode in the method of operating the water electrolysis and electricity generating system 10.

Figure 10:
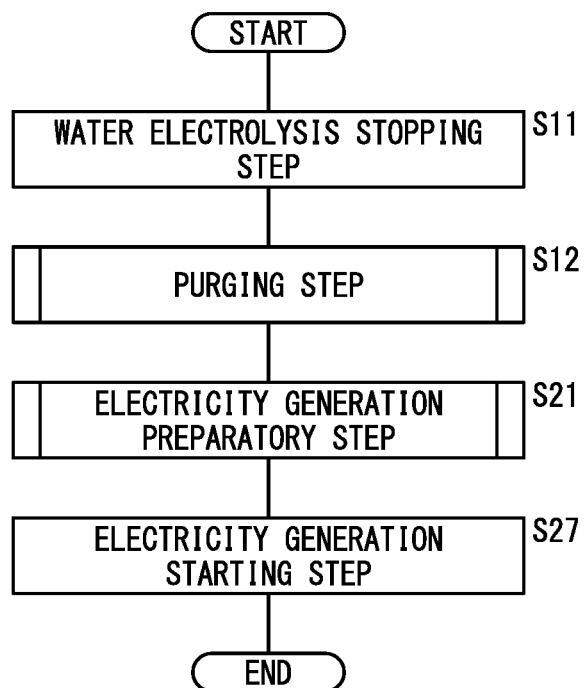
FIG. 10 is a flowchart illustrating switching from the water electrolysis mode to the electricity generating mode.

As shown in FIG. 10, when a request is made from the VPP server 240 to the system ECU 236 via the gateway server 238 to switch from the water electrolysis mode to the electricity generating mode, a water electrolysis stopping step is performed (step S11). In the water electrolysis stopping step, the system ECU 236 stops applying the voltage to the cell member 12 by the electrolytic power source 50.

Thereafter, a purging step of removing the residual water in the first fluid flow path 44 of the cell member 12 and the first supply flow path 82 is performed (step S12).

Figure 11:
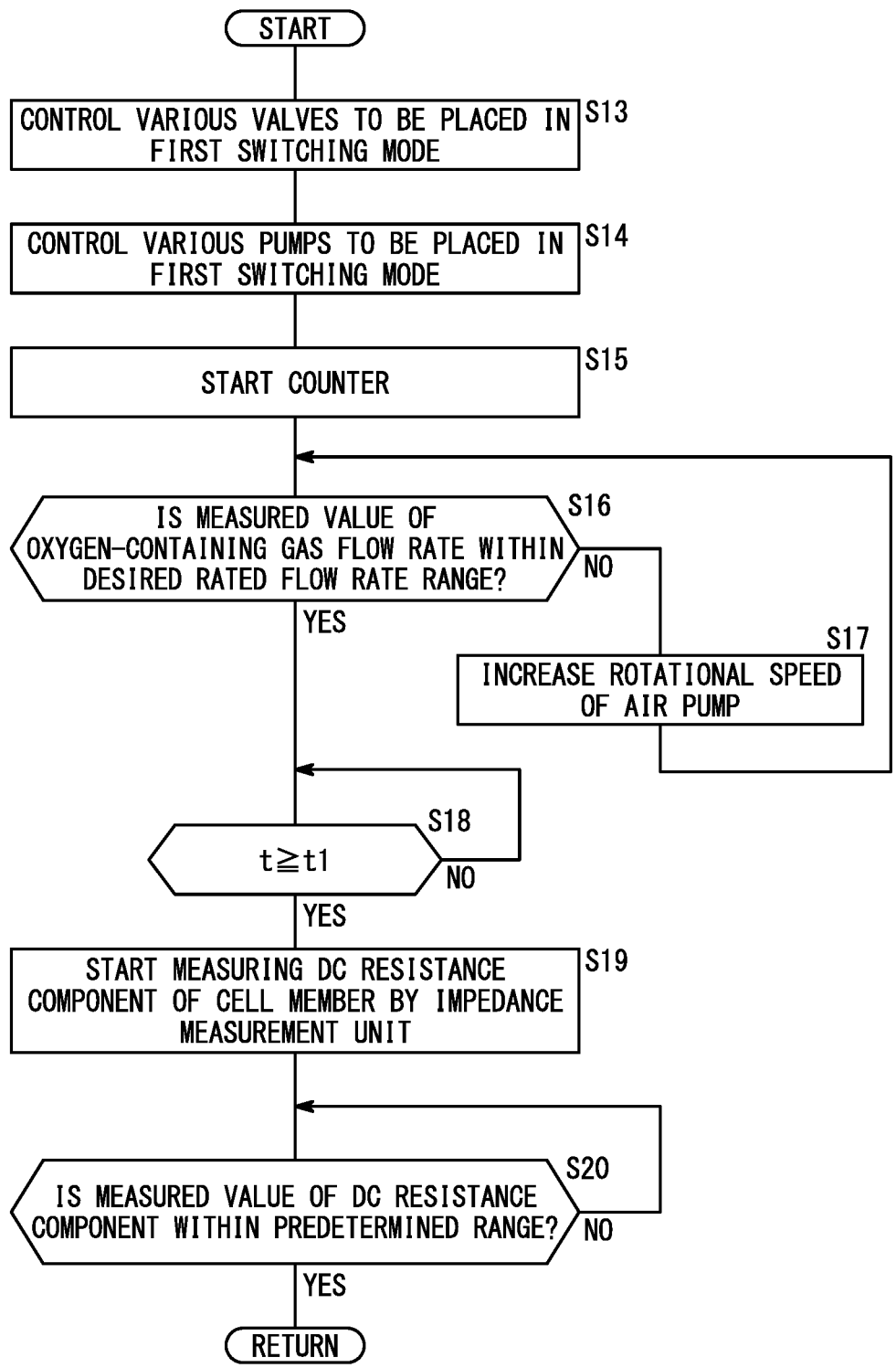
FIG. 11 is a flowchart illustrating a purging step shown in FIG. 10.
Figure 12:
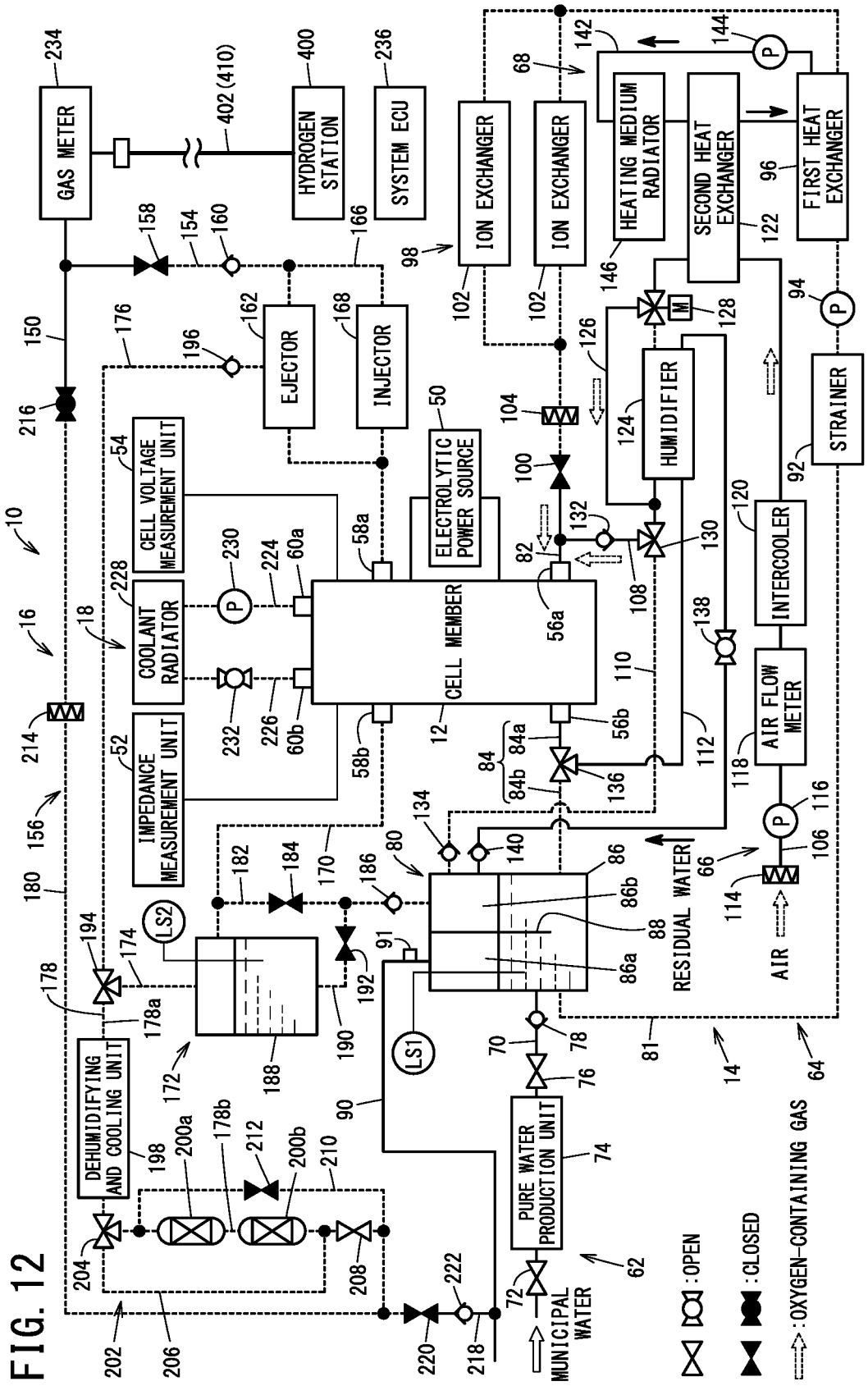
FIG. 12 is an explanatory diagram of operations in the purging step.

More specifically, in the purging step, the valve control unit 248 controls the various valves to place them in a first switching mode (step S13 of FIG. 11). In greater detail, as shown in FIG. 12, the valve control unit 248 closes the pure water supply valve 100 and the hydrogen gas supply valve 158, fully opens the first back pressure valve 138, and fully closes the second back pressure valve 216. Further, the valve control unit 248 controls the flow rate control valve 128 to bring about a state in which, while flowing through the first bypass flow path 126, the oxygen-containing gas does not flow through the humidifier 124. Furthermore, the valve control unit 248 controls the first flow path switching valve 130 to bring about the flow through state of the oxygen-containing gas introduction flow path 108. Further, the valve control unit 248 controls the second flow path switching valve 136 to bring about the flow through state of the oxygen-containing gas lead-out flow path 112.

Next, the pump control unit 250 controls the various pumps to place them in the first switching mode (step S14 of FIG. 11). In particular, the pump control unit 250 drives the air pump 116 at a maximum rated flow rate. Moreover, the pump control unit 250 does not initiate driving of the water pump 94 and the coolant pump 230.

Upon doing so, the oxygen-containing gas that has flowed into the oxygen-containing gas flow path 106 is supercharged by the air pump 116 after the foreign matter has been removed therefrom by the air filter 114. The oxygen-containing gas which has been raised in temperature due to supercharging flows through the air flow meter 118, and after having been cooled by the intercooler 120, is adjusted to a desired temperature by the second heat exchanger 122.

The oxygen-containing gas that has flowed through the second heat exchanger 122 flows from the flow rate control valve 128 and through the first bypass flow path 126 to detour around the humidifier 124. Thereafter, the oxygen-containing gas is introduced into the first inlet port member 56a of the cell member 12 via the first flow path switching valve 130, the oxygen-containing gas introduction flow path 108, and the first supply flow path 82. At this time, the water (residual water) remaining in a portion of the oxygen-containing gas introduction flow path 108 and a portion of the first supply flow path 82 can be washed away toward the first inlet port member 56a.

The oxygen-containing gas that was introduced into the first inlet port member 56a flows into the first outlet port member 56b while washing away the residual water that remains in the first fluid flow path 44. At this time, the oxygen-containing gas dries the first gas diffusion layer 36 (see FIG. 3) that was submerged at the time of the water electrolysis mode. Consequently, the volatility of the first gas diffusion layer 36 can be restored. The oxygen-containing gas, in which there is included the residual water that is led out from the first outlet port member 56b to the upstream side lead-out flow path 84a, is guided to the first storage unit 86 via the second flow path switching valve 136 and the oxygen-containing gas flow path 106.

Further, as shown in FIG. 11, when the air pump 116 is started at a maximum rated level of operation, the system ECU 236 starts the counter 256 (step S15). Next, the determination unit 254 determines whether or not the flow rate of the oxygen-containing gas (a measured value of the oxygen-containing gas flow rate) acquired by the air flow meter 118 has reached a desired rated flow rate range (step S16). In the case that the measured value of the oxygen-containing gas flow rate does not reach the desired rated flow rate range (step S16: NO), the pump control unit 250 increases the rotational speed of the air pump 116 (step S17). Thereafter, the process of step S16 is performed again.

In the case that the measured value of the oxygen-containing gas flow rate has reached the desired rated flow rate range (step S17: YES), the determination unit 254 determines whether or not a measured time period t of the counter 256 has reached a predetermined time period t1 (step S18). In the case that the measured time period t of the counter 256 has not reached the predetermined time period t1, the process of step S18 is repeated. The predetermined time period t1 is preferably set, for example, to a time period on the order of ten seconds.

If the measured time period t of the counter 256 reaches the predetermined time period t1 (step S18: YES), the impedance measurement unit 52 starts measuring the DC resistance component of the cell member 12 (step S19). Next, the determination unit 254 determines whether or not the DC resistance component (a measured value of the DC resistance component, the contained water amount of the cell member 12) measured by the impedance measurement unit 52 lies within a predetermined range (step S20). Stated otherwise, by using the measured value of the DC resistance component, the determination unit 254 determines whether or not the contained water amount of the cell member 12 lies within the predetermined range. In the case that the measured value of the DC resistance component does not lie within the predetermined range, the process of step S20 is repeated.

In the case that the measured value of the DC resistance component lies within the predetermined range (step S20: YES), the purging step is terminated, and an electricity generation preparatory step is performed (step S21).

Figure 13:
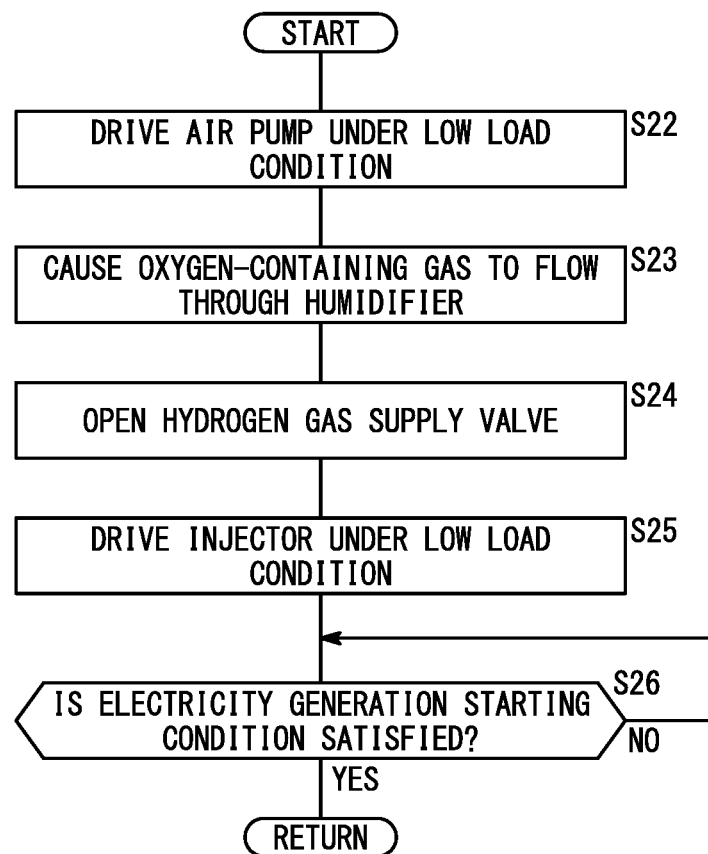
FIG. 13 is a flowchart illustrating an electricity generation preparatory step shown in FIG. 10.

In the electricity generation preparatory step, as shown in FIG. 13, the pump control unit 250 drives the air pump 116 under a low load condition (a load condition that is lower than a required load value at the time of the electricity generating mode) (step S22). Stated otherwise, the pump control unit 250 reduces the rotational speed of the air pump 116.

Subsequently, the valve control unit 248 controls the flow rate control valve 128 to bring about a state in which the oxygen-containing gas flows through the humidifier 124 and the first bypass flow path 126. Consequently, the oxygen-containing gas that has passed through the humidifier 124 is guided to the cell member 12 (step S23). Further, the valve control unit 248 opens the hydrogen gas supply valve 158 (step S24). Consequently, the hydrogen gas, which has flowed from the low pressure hydrogen pipeline 402 into the supply and discharge flow path 150, is guided to the cell member 12. Further, the injector control unit 252 drives the injector 168 under a low load condition (step S25). Consequently, each of the cells 20 of the cell member 12 generates electricity under the low load condition.

Thereafter, the determination unit 254 determines whether or not an electricity generation starting condition has been satisfied (step S26). More specifically, the determination unit 254 determines whether or not the cell voltage (cell voltage measurement value) of each of the cells 20 measured by the cell voltage measurement unit 54 reaches a value of greater than or equal to a predetermined value, and a deviation in the cell voltage variation lies within a predetermined deviation. In the case that the measured cell voltage reaches a value of greater than or equal to the predetermined value, and the deviation in the cell voltage variation does not lie within the predetermined deviation (step S26: NO), the process of step S26 is repeated.

In the case that the measured cell voltage reaches a value of greater than or equal to the predetermined value, and the deviation in the cell voltage variation lies within the predetermined deviation (step S26: YES), the system ECU 236 implements an electricity generation starting step of causing the cell member 12 to generate electricity based on a predetermined required load value (step S27 in FIG. 10). At this time, the system ECU 236 slope-controls (increases at a constant rate) application of a load current to the cell member 12 in a manner so as to satisfy a predetermined electricity generating condition. Further, based on a required load value needed to supplement the system electrical power, the system ECU 236 determines the amount of hydrogen gas supplied to the cell member 12 and the load current.

In the purging step, at a time of switching from the water electrolysis mode to the electricity generating mode, measurement of the impedance is set between 1 kHz and 10 kHz. Further, in the purging step, a superimposed current of an AC impedance sine wave is on the order of ±2 A. Since the contained water amount of the cell member 12 can be controlled to reside within a predetermined range, drying up (a rise in resistance due to drying of the electrolyte membrane 28) can be reliably prevented. In particular, when the electrolyte membrane 28 experiences localized drying in the vicinity of the first inlet port member 56a, a reaction distribution in the surfaces of the cell electrodes is generated when the generation of electricity is started, and the generation of electricity tends to become unstable. When this occurs, there is a possibility that generation of heat at the dried portion may accelerate the deterioration of the electrolyte membrane 28. However, by controlling the contained water amount of the cell member 12, deterioration of the electrolyte membrane 28 due to localized drying of the electrolyte membrane 28 can be prevented. Consequently, it is possible to stabilize the generation of electricity.

Next, a description will be given concerning a process of switching from the electricity generating mode to the water electrolysis mode in the method of operating the water electrolysis and electricity generating system 10.

Figure 14A:
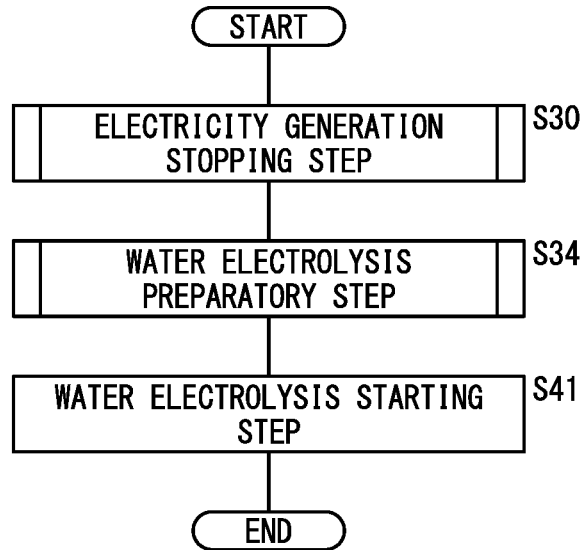
FIG. 14A is a flowchart illustrating switching from the electricity generating mode to the water electrolysis mode.
Figure 14B:
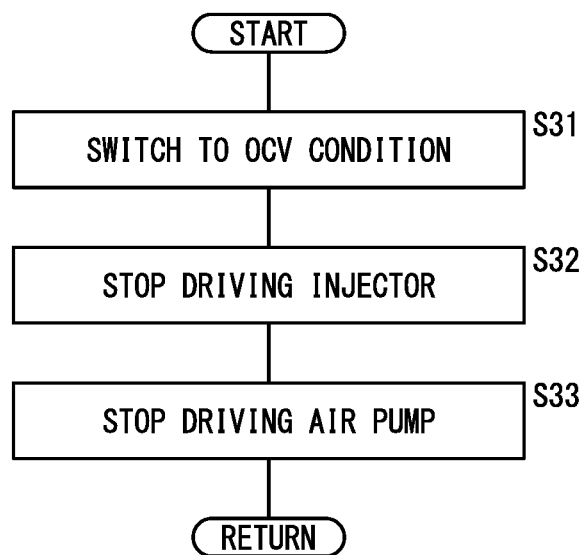
FIG. 14B is a flowchart illustrating an electricity generation stopping step shown in FIG. 14A.

As shown in FIG. 14A, when a request is made from the VPP server 240 to the system ECU 236 via the gateway server 238 to switch from the electricity generating mode to the water electrolysis mode, an electricity generation stopping step is performed (step S30). More specifically, as shown in FIG. 14B, in the electricity generation stopping step, the system ECU 236 switches to an open circuit voltage (OCV) condition (step S31). In particular, the system ECU 236 slope-controls (decreases at a constant rate) the flow rate and the load current of the hydrogen gas and the oxygen-containing gas supplied to the cell member 12 so as to bring about the OCV condition.

Next, when the OCV condition is brought about, the injector control unit 252 stops driving the injector 168 (step S32), and the pump control unit 250 stops driving the air pump 116 (step S33). Consequently, supplying of the hydrogen gas and the oxygen-containing gas to the cell member 12 is stopped.

Thereafter, a water electrolysis preparatory step is carried out (step S34 of FIG. 14A). In the water electrolysis preparatory step, the valve control unit 248 controls the various valves to place them in a second switching mode (step S35). More specifically, as shown in FIG. 6, the valve control unit 248 opens the pure water supply valve 100 and closes the hydrogen gas supply valve 158 and the purge valve 184.

Further, the valve control unit 248 controls the flow rate control valve 128 to bring about a flow through state of the first bypass flow path 126. Furthermore, the valve control unit 248 controls the first flow path switching valve 130 to bring about the flow through state of the dilution flow path 110. Further, the valve control unit 248 controls the second flow path switching valve 136 to bring about the flow through state of the downstream side lead-out flow path 84*b*. Furthermore, the valve control unit 248 controls the third flow path switching valve 194 to bring about the flow through state of the dehumidifying flow path 178.

Figure 15:
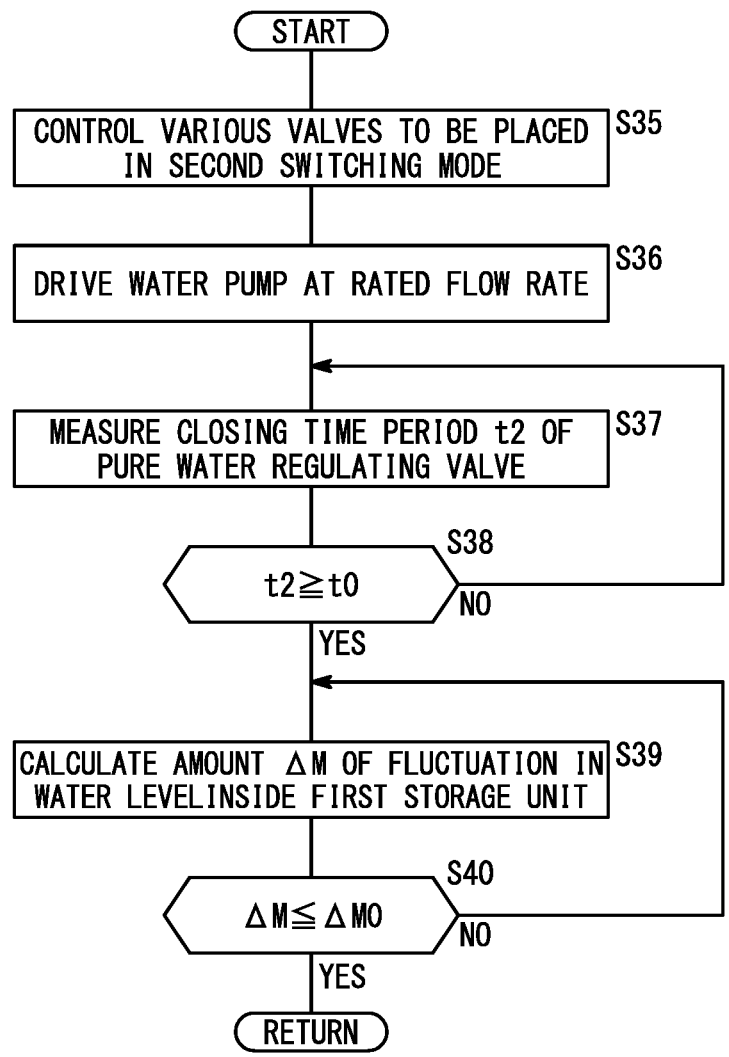
FIG. 15 is a flowchart illustrating a water electrolysis preparatory step shown in FIG. 14A.

Next, as shown in FIG. 15, the pump control unit 250 drives the water pump 94 at the rated flow rate (step S36). Upon doing so, the water inside the first storage unit 86 is supplied to the cell member 12 via the first supply flow path 82. The water that is led out from the cell member 12 flows through the first lead-out flow path 84, and is returned to the first storage unit 86.

When the water pump 94 is driven, a determination is made as to whether or not inclusion of air (mixing of air) has occurred in the first supply flow path 82, and first fluid flow path 44 of the cell member 12 and the first lead-out flow path 84. More specifically, the system ECU 236 measures a closing time period t2 (valve opening interval) of the pure water regulating valve 76 (step S37). Next, the determination unit 254 determines whether or not the closing time period t2 of the pure water regulating valve 76 is greater than or equal to the predetermined time period t0 (step S38). In the case that the closing time period t2 of the pure water regulating valve 76 does not reach the predetermined time period t0 (step S38: NO), the process of step S37 is performed again. More specifically, in the case that the water level acquired by the first water level sensor LS1 is lower than the lower limit level, the pure water regulating valve 76 is opened, and therefore, the process of step S37 is performed again.

In the case that the closing time period t2 of the pure water regulating valve 76 has become greater than or equal to the predetermined time period t0 (step S38: YES), then based on the water level inside the first storage unit 86 acquired by the first water level sensor LS1, the system ECU 236 calculates an amount of fluctuation ΔM in the water level per unit time inside the first storage unit 86 (step S39). Stated otherwise, step S39 is carried out in the case that the predetermined time period t0 has elapsed after the water level acquired by the first water level sensor LS1 has reached the reference level and the pure water regulating valve 76 has been closed. Subsequently, the determination unit 254 makes a determination as to whether or not the calculated amount of fluctuation ΔM in the water level lies within a predetermined amount of fluctuation ΔM0 in the water level (step S40). In the case that the calculated amount of fluctuation ΔM in the water level is greater than the predetermined amount of fluctuation ΔM0 in the water level, the processes of step S39 and thereafter are performed again.

In the case that the calculated amount of fluctuation ΔM in the water level lies within the predetermined amount of fluctuation ΔM0 in the water level, the system ECU 236 determines that the first supply flow path 82, and the first fluid flow path 44 of the cell member 12 and the first lead-out flow path 84 have been replaced with water (pure water), and a water electrolysis starting step is performed (step S41 of FIG. 14A). In particular, the system ECU 236 drives the electrolytic power source 50 and applies a voltage to the cell member 12.

The present embodiment exhibits the following advantageous effects.

The water electrolysis and electricity generating system 10 is equipped with the first supply flow path 82, the first lead-out flow path 84, the water introduction flow path 81, the oxygen-containing gas flow path 106, the oxygen-containing gas introduction flow path 108, the first gas-liquid separator 80, and the dilution flow path 110. The first supply flow path 82 is connected to the first inlet port member 56*a* that communicates with the first fluid flow path 44. The first lead-out flow path 84 is connected to the first outlet port member 56*b* that communicates with the first fluid flow path 44, and at the time of the water electrolysis mode, the gas-containing water containing the product hydrogen gas is led out. The water introduction flow path 81 introduces the water into the first supply flow path 82. The oxygen-containing gas flows through the oxygen-containing gas flow path 106. The oxygen-containing gas introduction flow path 108 introduces the oxygen-containing gas that flows through the oxygen-containing gas flow path 106 into the first supply flow path 82. The first gas-liquid separator 80 separates into a gas and a liquid the gas-containing water that is guided from the first lead-out flow path 84. The dilution flow path 110 guides the oxygen-containing gas that flows through the oxygen-containing gas flow path 106 to the first gas-liquid separator 80 as a diluting gas.

In accordance with such a configuration, at the time of the water electrolysis mode, the water can be supplied from the water introduction flow path 81 to the first inlet port member 56*a* via the first supply flow path 82, and at the time of the electricity generating mode, the oxygen-containing gas can be supplied from the oxygen-containing gas flow path 106 to the first inlet port member 56*a* via the oxygen-containing gas introduction flow path 108 and the first supply flow path 82. More specifically, the first supply flow path 82 serves both as a flow path for supplying water and a flow path for supplying the oxygen-containing gas. A more compact configuration is brought about, in comparison with a case in which each of the water supply flow path and the oxygen-containing gas supply flow path are connected respectively to the cell member 12.

Further, the oxygen-containing gas that flows through the oxygen-containing gas flow path 106 at the time of the water electrolysis mode can also be used as a diluting gas for the first gas-liquid separator 80. Consequently, a more compact configuration can be brought about, compared with a case in which a device for supplying the oxygen-containing gas to the cell member 12, and a device for supplying the diluting gas to the first gas-liquid separator 80 are separately provided. Thus, the water electrolysis and electricity generating system 10 can be made smaller in scale, together with enabling a reduction in the manufacturing cost of the system by a simple configuration.

The water electrolysis and electricity generating system 10 is equipped with the first flow path switching valve 130 that is capable of switching between the flow through state of the oxygen-containing gas introduction flow path 108 and the flow through state of the dilution flow path 110. The flow through state of the oxygen-containing gas introduction flow path 108 is a state in which the flow of the oxygen-containing gas from the oxygen-containing gas flow path 106 to the oxygen-containing gas introduction flow path 108 is permitted, together with blocking the flow of the oxygen-containing gas from the oxygen-containing gas flow path 106 to the dilution flow path 110. The flow through state of the dilution flow path 110 is a state in which the flow of the oxygen-containing gas from the oxygen-containing gas flow path 106 to the oxygen-containing gas introduction flow path 108 is blocked, together with permitting the flow of the oxygen-containing gas from the oxygen-containing gas flow path 106 to the dilution flow path 110.

In accordance with such a configuration, at the time of the water electrolysis mode, by the first flow path switching valve 130 being operated to bring about the flow through state of the dilution flow path 110, the oxygen-containing gas can be introduced into the first gas-liquid separator 80. Further, at the time of the electricity generating mode, by the first flow path switching valve 130 being operated to bring about the flow through state of the oxygen-containing gas introduction flow path 108, the oxygen-containing gas can be introduced into the cell member 12.

Only one air pump 116 is installed in the oxygen-containing gas flow path 106. At the time of the water electrolysis mode, the oxygen-containing gas discharged from the air pump 116 is guided to the first gas-liquid separator 80 via the dilution flow path 110. At the time of the electricity generating mode, the oxygen-containing gas discharged from the air pump 116 is guided to the first fluid flow path 44 of the cell member 12 via the oxygen-containing gas introduction flow path 108 and the first supply flow path 82.

In accordance with such a configuration, the oxygen-containing gas that is used for generating electricity, and the oxygen-containing gas that is used for dilution can be supplied by one air pump 116. Therefore, by using the devices in common, it is possible to reduce costs.

The water electrolysis and electricity generating system 10 is equipped with the heating medium circulation flow path 142 and the heating medium pump 144. A heating medium flows through the heating medium circulation flow path 142. The heating medium pump 144 causes the heating medium to be circulated through the heating medium circulation flow path 142. The first heat exchanger 96 and the second heat exchanger 122 are installed in the heating medium circulation flow path 142. The first heat exchanger 96 carries out heat exchange between the water that flows through the water introduction flow path 81 and the heating medium. The second heat exchanger 122 carries out heat exchange between the oxygen-containing gas that flows through the oxygen-containing gas flow path 106 and the heating medium.

In accordance with such a configuration, since heat exchange is carried out by the first heat exchanger 96 between the water that flows through the water introduction flow path 81 and the heating medium (in the first heat exchanger 96, the water that flows through the water introduction flow path 81 does not carry out heat exchange directly with the exterior air), even in the case that the exterior air is below the freezing point, it is possible to prevent the water in the water introduction flow path 81 from freezing. Further, since the heating medium that receives heat from the oxygen-containing gas at the second heat exchanger 122 circulates in the heating medium circulation flow path 142, it is possible to further suppress freezing of the water in the water introduction flow path 81.

The heating medium radiator 146 in order to cool the heating medium is installed in the heating medium circulation flow path 142. The heating medium that is led out from the heating medium radiator 146, after having flowed sequentially in this order through the second heat exchanger 122 and the first heat exchanger 96, is returned to the heating medium radiator 146.

In accordance with such a configuration, the oxygen-containing gas that flows through the oxygen-containing gas flow path 106 can be efficiently cooled by the second heat exchanger 122. Further, in the case that the exterior air is below the freezing point, the heating medium, which has received heat from the oxygen-containing gas at the second heat exchanger 122, flows through the first heat exchanger 96 before being guided to the heating medium radiator 146. Therefore, freezing of the water in the water introduction flow path 81 can be further suppressed.

The humidifier 124 in order to humidify the oxygen-containing gas is installed on a more downstream side than the second heat exchanger 122 in the oxygen-containing gas flow path 106. In the humidifier 124, at the time of the electricity generating mode, the oxygen-containing gas is humidified by the oxygen containing exhaust gas that is led out from the first outlet port member 56*b*.

In accordance with such a configuration, the oxygen-containing gas, which is temperature-controlled (cooled) by the second heat exchanger 122, is guided to the humidifier 124. Therefore, even if the oxygen-containing gas, which has been raised in temperature by the cell member 12 at the time of the electricity generating mode, flows through the humidifier 124, it is possible to prevent the temperature and the humidity of the oxygen-containing gas that is introduced into the cell member 12 from rising excessively.

The first bypass flow path 126 and the flow rate control valve 128 are installed in the oxygen-containing gas flow path 106. The first bypass flow path 126 is connected to the upstream side of the humidifier 124 and the downstream side of the humidifier 124 to detour around the humidifier 124. The flow rate control valve 128 is capable of adjusting the ratio between the flow rate of the oxygen-containing gas that is guided to the humidifier 124 and the flow rate of the oxygen-containing gas that is guided to the first bypass flow path 126.

In accordance with such a configuration, at the time of switching from the water electrolysis mode to the electricity generating mode, the dried oxygen-containing gas, which has flowed through the first bypass flow path 126, can be introduced into the cell member 12. Therefore, the water drainage process (purging process) of the residual water remaining in the first fluid flow path 44 of the cell member 12 can be efficiently performed.

The water electrolysis and electricity generating system 10 is equipped with the second supply flow path 154, the second lead-out flow path 170, the second gas-liquid separator 172, the hydrogen exhaust gas circulation flow path 176, and the storage flow path 180. The second supply flow path 154 supplies the hydrogen gas to the second fluid flow path 46. At the time of the water electrolysis mode, the product hydrogen gas is led out from the second fluid flow path 46, and further, at the time of the electricity generating mode, the hydrogen exhaust gas is led out from the second fluid flow path 46 into the second lead-out flow path 170. The second gas-liquid separator 172 separates into a gas and a liquid the product hydrogen gas and the hydrogen exhaust gas which have been guided from the second lead-out flow path 170. The hydrogen exhaust gas circulation flow path 176 guides the hydrogen exhaust gas, which has been separated into a gas and a liquid by the second gas-liquid separator 172, to the second supply flow path 154. The storage flow path 180 guides the product hydrogen gas, which has been separated into a gas and a liquid by the second gas-liquid separator 172, to the hydrogen storage unit 410. In the water electrolysis and electricity generating system 10, the second lead-out flow path 170 and the second gas-liquid separator 172 are shared in common by the water electrolysis mode and the electricity generating mode.

In accordance with such a configuration, since the second lead-out flow path 170 and the second gas-liquid separator 172 are shared in common by the water electrolysis mode and the electricity generating mode, there is no need to separately provide a lead-out flow path and a gas-liquid separator for use by the water electrolysis mode, and a lead-out flow path and a gas-liquid separator for use by the electricity generating mode. Therefore, the water electrolysis and electricity generating system 10 can be made smaller in scale, together with enabling a reduction in the manufacturing cost of the system by a simple configuration.

The water electrolysis and electricity generating system 10 is equipped with the intermediate lead-out flow path 174, the dehumidifying flow path 178, and the second flow path switching valve 136. The product hydrogen gas and the hydrogen exhaust gas, which have flowed through the second gas-liquid separator 172, are led out to the intermediate lead-out flow path 174. The dehumidifying flow path 178 dehumidifies the product hydrogen gas that flows through the intermediate lead-out flow path 174, and guides the dehumidified hydrogen gas to the storage flow path 180. The second flow path switching valve 136 is capable of switching between a flow through state of the dehumidifying flow path 178 and a flow through state of the hydrogen exhaust gas circulation flow path 176. The flow through state of the dehumidifying flow path 178 is a state in which the flow of the hydrogen exhaust gas from the intermediate lead-out flow path 174 to the hydrogen exhaust gas circulation flow path 176 is permitted, together with blocking the flow of the hydrogen exhaust gas from the intermediate lead-out flow path 174 to the dehumidifying flow path 178. The flow through state of the hydrogen exhaust gas circulation flow path 176 is a state in which the flow of the product hydrogen gas from the intermediate lead-out flow path 174 to the dehumidifying flow path 178 is permitted, together with blocking the flow of the product hydrogen gas from the intermediate lead-out flow path 174 to the hydrogen exhaust gas circulation flow path 176.

In accordance with such a configuration, at the time of the water electrolysis mode, by the second flow path switching valve 136 being operated to bring about the flow through state of the dehumidifying flow path 178, the product hydrogen gas that is led out from the second gas-liquid separator 172 to the intermediate lead-out flow path 174 can be guided to the hydrogen storage unit 410 via the dehumidifying flow path 178 and the storage flow path 180. Further, at the time of the electricity generating mode, by the second flow path switching valve 136 being operated to bring about the flow through state of the hydrogen exhaust gas circulation flow path 176, the hydrogen exhaust gas that is led out from the second gas-liquid separator 172 to the intermediate lead-out flow path 174 can be introduced into the cell member 12 via the hydrogen exhaust gas circulation flow path 176 and the second supply flow path 154.

The first dehumidifying adsorption unit 200a, the second dehumidifying adsorption unit 200b, and the dehumidification switching unit 202 are installed in the dehumidifying flow path 178. The first dehumidifying adsorption unit 200a and the second dehumidifying adsorption unit 200b are capable of dehumidifying the product hydrogen gas and restoring the dehumidifying function thereof. The dehumidification switching unit 202 switches the direction in which the product hydrogen gas flows, in a manner so that the order in which the product hydrogen gas flows through the first dehumidifying adsorption unit 200a and the second dehumidifying adsorption unit 200b is changed.

In accordance with such a configuration, at the time of the water electrolysis mode, the first dehumidifying adsorption unit 200a and the second dehumidifying adsorption unit 200b can undergo self-regeneration. Therefore, the replacement interval of the first dehumidifying adsorption unit 200a and the second dehumidifying adsorption unit 200b can be prolonged.

The water electrolysis and electricity generating system 10 is equipped with the supply and discharge flow path 150. The supply and discharge flow path 150 leads the product hydrogen gas in the storage flow path 180 out to the hydrogen storage unit 410. Further, the supply and discharge flow path 150 introduces the hydrogen gas in the hydrogen storage unit 410 into the second supply flow path 154. The gas meter 234, which acquires the flow rate of the hydrogen gas from the hydrogen storage unit 410 to the supply and discharge flow path 150 and the flow rate of the product hydrogen gas from the supply and discharge flow path 150 to the hydrogen storage unit 410, is installed in the supply and discharge flow path 150.

In accordance with such a configuration, due to the information acquired by the gas meter 234, the amount of the hydrogen gas that is introduced and the amount of the product hydrogen gas that is led out can be easily controlled.

The method of operating the water electrolysis and electricity generating system 10 includes, at the time of switching from the water electrolysis mode to the electricity generating mode, the water electrolysis stopping step, the purging step, and the electricity generation starting step. In the water electrolysis stopping step, the water electrolysis by the cell member 12 is stopped. In the purging step, after the water electrolysis stopping step, the oxygen-containing gas is supplied from the oxygen-containing gas flow path 106 to the first fluid flow path 44 via the oxygen-containing gas introduction flow path 108, the first supply flow path 82, and the first inlet port member 56a. In the electricity generation starting step, after the purging step, the cell member 12 is made to generate electricity based on the predetermined required load value.

In accordance with such a method, by the purging step, at the time of the water electrolysis mode, the water (residual water) existing in the first supply flow path 82 and the first fluid flow path 44 of the cell member 12 can be drained into the first gas-liquid separator 80 by the oxygen-containing gas. Consequently, it is possible to smoothly and reliably carry out switching from the water electrolysis mode to the electricity generating mode. Further, since a portion of the first supply flow path 82 is used as the water supply flow path and the purge flow path, the water electrolysis and electricity generating system 10 can be made smaller in scale, together with enabling a reduction in the manufacturing cost of the system.

In the purging step, the first electrode 30 is dried by the oxygen-containing gas that flows through the first fluid flow path 44.

In accordance with such a method, the generation of electricity by the cell member 12 can be smoothly started in the electricity generation starting step.

The humidifier 124 and the first bypass flow path 126 are installed in the oxygen-containing gas flow path 106. The humidifier 124 humidifies the oxygen-containing gas. The first bypass flow path 126 is connected to an upstream side and a downstream side of the humidifier 124 in the oxygen-containing gas flow path 106 to detour around the humidifier 124. In the purging step, the oxygen-containing gas is allowed to flow through the first bypass flow path 126 without being allowed to flow through the humidifier 124.

In accordance with such a method, the first electrode 30 can be efficiently dried during the purging step.

The cell member 12 includes the plurality of cells 20. The method of operating the water electrolysis and electricity generating system 10 includes the electricity generation preparatory step, which is performed between the purging step and the electricity generation starting step. In the electricity generation preparatory step, the cell member 12 is made to generate electricity under the low load condition which is lower than the required load value, and the cell voltage of each of the cells 20 is acquired. The electricity generation starting step is carried out in the case that each of the cell voltages acquired in the electricity generation preparatory step has reached a value of greater than or equal to the predetermined value.

In accordance with such a method, each of the cells 20 can reliably be made to generate electricity in the electricity generation starting step.

In the electricity generation preparatory step, a determination is made as to whether or not a deviation in the cell voltage of the plurality of cells 20 resides within a predetermined range. The electricity generation starting step is carried out in the case that the deviation in the cell voltage lies within the predetermined range in the electricity generation preparatory step.

In accordance with such a method, in the electricity generation starting step, each of the cells 20 can be made to generate electricity in a well-balanced manner.

The method of operating the water electrolysis and electricity generating system 10 includes, at the time of switching from the electricity generating mode to the water electrolysis mode, the electricity generation stopping step and the water electrolysis starting step. In the electricity generation stopping step, the generation of electricity in the cell member 12 is stopped. In the water electrolysis starting step, in the case that the water level inside the first gas-liquid separator 80 is greater than or equal to the lower limit level, the water electrolysis of the cell member 12 is initiated.

In accordance with such a method, since water electrolysis is initiated in the case that the water level in the first gas-liquid separator 80 is greater than or equal to the lower limit level, it is possible to suppress mixing of air into the water that is supplied to the cell member 12 at the time of the water electrolysis starting step. Consequently, it is possible to smoothly carry out switching from the electricity generating mode to the water electrolysis mode.

In the water electrolysis starting step, in the case that the amount of fluctuation $\Delta M$ in the water level per unit time inside the first gas-liquid separator 80 is less than or equal to the predetermined amount of fluctuation $\Delta M0$ in the water level, the water electrolysis of the cell member 12 is initiated.

In accordance with such a method, it is possible to further suppress the mixing of air into the water that is supplied to the cell member 12 at the time of the water electrolysis starting step.

The number of dehumidifying and adsorption units of the water electrolysis and electricity generating system 10 is not limited to two, and may be three or more.

The present invention is not limited to the embodiment described above, and it goes without saying that various modified or additional configurations could be adopted therein without departing from the essence and gist of the present invention.

The embodiment described above can be summarized in the following manner.

In the above-described embodiment, there is disclosed the water electrolysis and electricity generating system (10) comprising the cell member (12) having the MEA (22) in which the electrolyte membrane (28) is sandwiched between the first electrode (30) and the second electrode (32), the first fluid flow path (44) that supplies the water and the oxygen-containing gas to the first electrode, and the second fluid flow path (46) that supplies the hydrogen gas to the second electrode, wherein the water electrolysis and electricity generating system is capable of being switched between the water electrolysis mode, in which the water supplied to the first electrode is electrolyzed to thereby generate product hydrogen gas at the second electrode, and the electricity generating mode, in which electricity is generated by an electrochemical reaction that takes place between the oxygen-containing gas supplied to the first electrode and the hydrogen gas supplied to the second electrode, the water electrolysis and electricity generating system further comprising the supply flow path (82) connected to the inlet port member (56*a*) that communicates with the first fluid flow path, the lead-out flow path (84) connected to the outlet port member (56*b*) that communicates with the first fluid flow path and from which the gas-containing water containing the product hydrogen gas is led out at the time of the water electrolysis mode, the water introduction flow path (81) through which the water is introduced into the supply flow path, the oxygen-containing gas flow path (106) through which the oxygen-containing gas flows, the oxygen-containing gas introduction flow path (108) which introduces the oxygen-containing gas that flows through the oxygen-containing gas flow path into the supply flow path, the gas-liquid separator (80) that separates into a gas and a liquid the gas-containing water that is guided from the lead-out flow path, and the dilution flow path (110) that guides the oxygen-containing gas that flows through the oxygen-containing gas flow path to the gas-liquid separator as a diluting gas.

In the above-described water electrolysis and electricity generating system, there may further be provided the flow path switching valve (130) that is capable of switching between a state in which the flow of the oxygen-containing gas from the oxygen-containing gas flow path to the oxygen-containing gas introduction flow path is permitted, together with blocking the flow of the oxygen-containing gas from the oxygen-containing gas flow path to the dilution flow path, and a state in which the flow of the oxygen-containing gas from the oxygen-containing gas flow path to the oxygen-containing gas introduction flow path is blocked, together with permitting the flow of the oxygen-containing gas from the oxygen-containing gas flow path to the dilution flow path.

In the above-described water electrolysis and electricity generating system, only one air pump (116) may be installed in the oxygen-containing gas flow path, wherein at the time of the water electrolysis mode, the oxygen-containing gas discharged from the air pump may be guided to the gas-liquid separator through the dilution flow path, and at the time of the electricity generating mode, the oxygen-containing gas may be guided to the first fluid flow path of the cell member via the oxygen-containing gas introduction flow path and the supply flow path.

In the above-described water electrolysis and electricity generating system, there may further be provided the heating medium circulation flow path (142) through which the heating medium flows, and the heating medium pump (144) in order to cause the heating medium to be circulated in the heating medium circulation flow path, wherein the first heat exchanger (96) that carries out heat exchange between the water that flows through the water introduction flow path and the heating medium, and the second heat exchanger (122) that carries out heat exchange between the oxygen-containing gas that flows through the oxygen-containing gas flow path and the heating medium may be installed in the heating medium circulation flow path.

In the above-described water electrolysis and electricity generating system, a heating medium radiator (146) in order to cool the heating medium may be installed in the heating medium circulation flow path, and the heating medium that is led out from the heating medium radiator may be returned to the heating medium radiator after having flowed sequentially in this order through the second heat exchanger and the first heat exchanger.

In the above-described water electrolysis and electricity generating system, the humidifier (124) in order to humidify the oxygen-containing gas may be installed in the oxygen-containing gas flow path on a more downstream side than the second heat exchanger, and in the humidifier, at the time of the electricity generating mode, the oxygen-containing gas may be humidified by the oxygen containing exhaust gas that is led out from the outlet port member.

In the above-described water electrolysis and electricity generating system, the bypass flow path (126), which is connected to the upstream side of the humidifier and the downstream side of the humidifier to detour around the humidifier, and the flow rate control valve (128), which is capable of adjusting a ratio between the flow rate of the oxygen-containing gas that is guided to the humidifier and the flow rate of the oxygen-containing gas that is guided to the bypass flow path, may be installed in the oxygen-containing gas flow path.

In the above-described embodiment, there is disclosed the water electrolysis and electricity generating system comprising the cell member having the MEA in which the electrolyte membrane is sandwiched between the first electrode and the second electrode, the first fluid flow path that supplies the water and the oxygen-containing gas to the first electrode, and the second fluid flow path that supplies the hydrogen gas to the second electrode, wherein the water electrolysis and electricity generating system is capable of being switched between the water electrolysis mode, in which the water supplied to the first electrode is electrolyzed to thereby generate product hydrogen gas at the second electrode, and the electricity generating mode, in which electricity is generated by an electrochemical reaction that takes place between the oxygen-containing gas supplied to the first electrode and the hydrogen gas supplied to the second electrode, the water electrolysis and electricity generating system further comprising the supply flow path (154) that supplies the hydrogen gas to the second fluid flow path, the lead-out flow path (170) through which the product hydrogen gas is led out from the second fluid flow path at a time of the water electrolysis mode, and through which the hydrogen exhaust gas is led out from the second fluid flow path at a time of the electricity generating mode, the gas-liquid separator (172) that separates into a gas and a liquid the product hydrogen gas and the hydrogen exhaust gas that are led out from the lead-out flow path, the circulation flow path (176) that guides the hydrogen exhaust gas, which has been separated into a gas and a liquid by the gas-liquid separator, to the supply flow path, and the storage flow path (180) that guides the product hydrogen gas, which has been separated into a gas and a liquid by the gas-liquid separator, to the hydrogen storage unit (410), wherein the lead-out flow path and the gas-liquid separator are shared in common by the hydrogen electrolysis mode and the electricity generating mode.

In the above-described water electrolysis and electricity generating system, there may further be provided the intermediate lead-out flow path (174) from which the product hydrogen gas and the hydrogen exhaust gas that have flowed through the gas-liquid separator are led out, the dehumidifying flow path (178) that dehumidifies the product hydrogen gas that flows through the intermediate lead-out flow path, and guides the product hydrogen gas to the storage flow path, and the flow path switching valve (194) that is capable of switching between a state in which, at the time of the water electrolysis mode, flow of the hydrogen exhaust gas from the intermediate lead-out flow path to the circulation flow path is permitted, together with blocking flow of the hydrogen exhaust gas from the intermediate lead-out flow path to the dehumidifying flow path, and a state in which, at the time of the electricity generating mode, flow of the product hydrogen gas from the intermediate lead-out flow path to the dehumidifying flow path is permitted, together with blocking flow of the product hydrogen gas from the intermediate lead-out flow path to the circulation flow path.

In the above-described water electrolysis and electricity generating system, in the dehumidifying flow path, there may be installed the plurality of dehumidifying adsorption units (200a, 200b) which are capable of dehumidifying the product hydrogen gas and restoring the dehumidifying function thereof, and the dehumidification switching unit (202) that switches a direction through which the product hydrogen gas flows, in a manner so that an order in which the product hydrogen gas flows through the plurality of dehumidifying adsorption units is changed.

In the above-described water electrolysis and electricity generating system, there may further be provided the supply and discharge flow path (150) in order to lead out the product hydrogen gas in the storage flow path to the hydrogen storage unit, and to introduce the hydrogen gas in the hydrogen storage unit into the supply flow path, wherein, in the supply and discharge flow path, there is installed the flow rate acquisition unit (234) that acquires the flow rate of the hydrogen gas from the hydrogen storage unit to the supply and discharge flow path, and the flow rate of the product hydrogen gas from the supply and discharge flow path to the hydrogen storage unit.

In the above-described embodiment, there is disclosed the method of operating the water electrolysis and electricity generating system comprising the cell member having the MEA in which the electrolyte membrane is sandwiched between the first electrode and the second electrode, the first fluid flow path that supplies the water and the oxygen-containing gas to the first electrode, and the second fluid flow path that supplies the hydrogen gas to the second electrode, wherein the water electrolysis and electricity generating system is capable of being switched between the water electrolysis mode, in which the water supplied to the first electrode is electrolyzed to thereby generate product hydrogen gas at the second electrode, and the electricity generating mode, in which electricity is generated by an electrochemical reaction that takes place between the oxygen-containing gas supplied to the first electrode and the hydrogen gas supplied to the second electrode, the water electrolysis and electricity generating system further comprising the supply flow path connected to the inlet port member that communicates with the first fluid flow path, the lead-out flow path connected to the outlet port member that communicates with the first fluid flow path and from which the gas-containing water containing the product hydrogen gas is led out at the time of the water electrolysis mode, the water introduction flow path through which the water is introduced into the supply flow path, the oxygen-containing gas flow path through which the oxygen-containing gas flows, the oxygen-containing gas introduction flow path which introduces the oxygen-containing gas that flows through the oxygen-containing gas flow path into the supply flow path, and the gas-liquid separator that separates into a gas and a liquid the gas-containing water that is guided from the lead-out flow path, the method of operating the water electrolysis and electricity generating system comprising, at a time of switching from the water electrolysis mode to the electricity generating mode, the water electrolysis stopping step of stopping the water electrolysis by the cell member, after the water electrolysis stopping step, the purging step of causing the oxygen-containing gas to flow from the oxygen-containing gas flow path to the gas-liquid separator via the oxygen-containing gas introduction flow path, the supply flow path, the inlet port member, the first fluid flow path, the outlet port member, and the lead-out flow path, and after the purging step, the electricity generation starting step of causing the cell member to generate electricity based on the predetermined required load value.

In the above-described method of operating the water electrolysis and electricity generating system, in the purging step, the first electrode may be dried by the oxygen-containing gas that flows through the first fluid flow path.

In the above-described method of operating the water electrolysis and electricity generating system, the humidifier in order to humidify the oxygen-containing gas, and the bypass flow path, which is connected to the upstream side of the humidifier and the downstream side of the humidifier to detour around the humidifier, may be installed in the oxygen-containing gas flow path, and in the purging step, the oxygen-containing gas may be made to flow through the bypass flow path without flowing through the humidifier.

In the above-described method of operating the water electrolysis and electricity generating system, the cell member may include a plurality of cells, there may further be provided the electricity generating preparatory step, which is performed after the purging step and prior to the electricity generation starting step, and in the electricity generating preparatory step, the cell member may be made to generate electricity under a low load condition that is lower than the required load value, each of the cell voltages of the cells may be acquired, and the electricity generation starting step may be implemented in the case that aforementioned each of the cell voltages acquired in the electricity generation preparatory step has reached a value that is greater than or equal to the predetermined value.

In the above-described method of operating the water electrolysis and electricity generating system, in the electricity generating preparatory step, it may be determined whether or not a deviation of the cell voltages of the plurality of cells lies within a predetermined range, and the electricity generation starting step may be implemented in the case that the deviation of the cell voltages lies within the predetermined range in the electricity generation preparatory step.

In the above-described embodiment, there is disclosed the method of operating the water electrolysis and electricity generating system comprising the cell member having the MEA in which the electrolyte membrane is sandwiched between the first electrode and the second electrode, the first fluid flow path that supplies the water and the oxygen-containing gas to the first electrode, and the second fluid flow path that supplies the hydrogen gas to the second electrode, wherein the water electrolysis and electricity generating system is capable of being switched between the water electrolysis mode, in which the water supplied to the first electrode is electrolyzed to thereby generate product hydrogen gas at the second electrode, and the electricity generating mode, in which electricity is generated by the electrochemical reaction that takes place between the oxygen-containing gas supplied to the first electrode and the hydrogen gas supplied to the second electrode, the water electrolysis and electricity generating system further comprising the water introduction flow path which supplies the water to the inlet port member that communicates with the first fluid flow path, the lead-out flow path connected to the outlet port member that communicates with the first fluid flow path and from which the gas-containing water containing the product hydrogen gas is led out at the time of the water electrolysis mode, and the gas-liquid separator, which is formed to be capable of storing the water therein together with the water introduction flow path being connected thereto, and to gas-liquid separate the gas-containing water that is guided from the lead-out flow path, wherein the method of operating the water electrolysis and electricity generating system comprises, at the time of switching from the electricity generating mode to the water electrolysis mode, an electricity generation stopping step of stopping the generation of electricity by the cell member, and a water electrolysis starting step of starting water electrolysis by the cell member in the case that the water level inside the gas-liquid separator is greater than or equal to the lower limit level.

In the above-described method of operating the water electrolysis and electricity generating system, in the water electrolysis starting step, in the case that the amount of fluctuation in the water level per unit time inside the gas-liquid separator is less than or equal to a predetermined fluctuation in the water level, the water electrolysis of the cell member may be initiated.

What is claimed is:

1. A water electrolysis and electricity generating system comprising a cell member having a membrane electrode assembly in which an electrolyte membrane is sandwiched between a first electrode and a second electrode, a first fluid flow path configured to supply water and an oxygen-containing gas to the first electrode, and a second fluid flow path configured to supply hydrogen gas to the second electrode;
wherein the water electrolysis and electricity generating system is capable of being switched between a water electrolysis mode, in which the water supplied to the first electrode is electrolyzed to thereby generate product hydrogen gas at the second electrode, and an electricity generating mode, in which electricity is generated by an electrochemical reaction that takes place between the oxygen-containing gas supplied to the first electrode and the hydrogen gas supplied to the second electrode;
the water electrolysis and electricity generating system further comprising:
a supply flow path configured to supply the hydrogen gas to the second fluid flow path;
a lead-out flow path through which the product hydrogen gas is led out from the second fluid flow path at a time of the water electrolysis mode, and through which a hydrogen exhaust gas is led out from the second fluid flow path at a time of the electricity generating mode;
a gas-liquid separator configured to separate into a gas and a liquid the product hydrogen gas and the hydrogen exhaust gas that are led out from the lead-out flow path;
a circulation flow path configured to guide the hydrogen exhaust gas, which has been separated into a gas and a liquid by the gas-liquid separator, to the supply flow path; and a storage flow path configured to guide the product hydrogen gas, which has been separated into a gas and a liquid by the gas-liquid separator, to a hydrogen storage unit;

an intermediate lead-out flow path from which the product hydrogen gas and the hydrogen exhaust gas that have flowed through the gas-liquid separator are led out;

a dehumidifying flow path configured to dehumidify the product hydrogen gas that flows through the intermediate lead-out flow path, and guide the product hydrogen gas to the storage flow path; and a flow path switching valve configured to be capable of switching between a state in which, at the time of the water electrolysis mode, flow of the hydrogen exhaust gas from the intermediate lead-out flow path to the circulation flow path is permitted, together with blocking flow of the hydrogen exhaust gas from the intermediate lead-out flow path to the dehumidifying flow path, and a state in which, at the time of the electricity generating mode, flow of the product hydrogen gas from the intermediate lead-out flow path to the dehumidifying flow path is permitted, together with blocking flow of the product hydrogen gas from the intermediate lead-out flow path to the circulation flow path, wherein the lead-out flow path and the gas-liquid separator are shared in common by the water electrolysis mode and the electricity generating mode.

2. The water electrolysis and electricity generating system according to claim 1, wherein, in the dehumidifying flow path, there are installed:

a plurality of dehumidifying adsorption units configured to be capable of dehumidifying the product hydrogen gas and restoring a dehumidifying function thereof; and a dehumidification switching unit configured to switch a direction through which the product hydrogen gas flows, in a manner so that an order in which the product hydrogen gas flows through the plurality of dehumidifying adsorption units is changed.

3. A water electrolysis and electricity generating system comprising a cell member having a membrane electrode assembly in which an electrolyte membrane is sandwiched between a first electrode and a second electrode, a first fluid flow path configured to supply water and an oxygen-containing gas to the first electrode, and a second fluid flow path configured to supply hydrogen gas to the second electrode;

wherein the water electrolysis and electricity generating system is capable of being switched between a water electrolysis mode, in which the water supplied to the first electrode is electrolyzed to thereby generate product hydrogen gas at the second electrode, and an electricity generating mode, in which electricity is generated by an electrochemical reaction that takes place between the oxygen-containing gas supplied to the first electrode and the hydrogen gas supplied to the second electrode;

the water electrolysis and electricity generating system further comprising:

a supply flow path configured to supply the hydrogen gas to the second fluid flow path;

a lead-out flow path through which the product hydrogen gas is led out from the second fluid flow path at a time of the water electrolysis mode, and through which a hydrogen exhaust gas is led out from the second fluid flow path at a time of the electricity generating mode;

a gas-liquid separator configured to separate into a gas and a liquid the product hydrogen gas and the hydrogen exhaust gas that are led out from the lead-out flow path;

a circulation flow path configured to guide the hydrogen exhaust gas, which has been separated into a gas and a liquid by the gas-liquid separator, to the supply flow path; and a storage flow path configured to guide the product hydrogen gas, which has been separated into a gas and a liquid by the gas-liquid separator, to a hydrogen storage unit;

a supply and discharge flow path configured to lead out the product hydrogen gas in the storage flow path to the hydrogen storage unit, and to introduce the hydrogen gas in the hydrogen storage unit into the supply flow path;

wherein the lead-out flow path and the gas-liquid separator are shared in common by the water electrolysis mode and the electricity generating mode, and wherein, in the supply and discharge flow path, there is installed a flow rate acquisition unit configured to acquire a flow rate of the hydrogen gas from the hydrogen storage unit to the supply and discharge flow path, and a flow rate of the product hydrogen gas from the supply and discharge flow path to the hydrogen storage unit.

* * * * *